US007986160B2

(12) United States Patent
Hoang et al.

(10) Patent No.: US 7,986,160 B2
(45) Date of Patent: Jul. 26, 2011

(54) APPARATUS AND METHODS FOR ADJUSTING PERFORMANCE CHARACTERISTICS AND POWER CONSUMPTION OF PROGRAMMABLE LOGIC DEVICES

(75) Inventors: Tim Tri Hoang, San Jose, CA (US); Sergey Shumarayev, San Leandro, CA (US)

(73) Assignee: Altera Corporation, San Jose, CA (US)

( * ) Notice: Subject to any disclaimer, the term of this patent is extended or adjusted under 35 U.S.C. 154(b) by 0 days.

(21) Appl. No.: 11/420,737

(22) Filed: May 27, 2006

(65) Prior Publication Data

US 2006/0202714 A1    Sep. 14, 2006

Related U.S. Application Data

(63) Continuation-in-part of application No. 11/006,420, filed on Dec. 7, 2004.

(51) Int. Cl.
*H03K 17/16* (2006.01)
*H03K 19/173* (2006.01)

(52) U.S. Cl. ............................................. 326/30; 326/38
(58) Field of Classification Search .............. 326/37–41, 326/47, 101
See application file for complete search history.

(56) References Cited

U.S. PATENT DOCUMENTS

| 5,057,704 | A | 10/1991 | Koyanagi |
| 5,600,264 | A | 2/1997 | Duong et al. |
| 5,610,533 | A | 3/1997 | Arimoto et al. |
| 5,631,606 | A | 5/1997 | Tran |
| 5,661,685 | A | 8/1997 | Lee et al. |
| 5,686,752 | A | 11/1997 | Ishimura et al. |
| 5,781,062 | A * | 7/1998 | Mashiko et al. .............. 327/544 |
| 6,157,691 | A * | 12/2000 | Wei ................................ 375/376 |
| 6,366,128 | B1 | 4/2002 | Ghia et al. |
| 6,583,646 | B1 | 6/2003 | Patel et al. |
| 6,650,141 | B2 * | 11/2003 | Agrawal et al. .................. 326/41 |
| 7,002,397 | B2 | 2/2006 | Kubo et al. |
| 7,026,840 | B1 * | 4/2006 | May et al. ......................... 326/38 |
| 7,080,270 | B2 * | 7/2006 | Yokozeki et al. ............. 713/320 |
| 7,548,091 | B1 * | 6/2009 | Liu .................................. 326/40 |
| 2002/0000831 | A1 * | 1/2002 | Smith ............................. 326/39 |
| 2003/0001633 | A1 * | 1/2003 | Gresham ........................ 327/141 |
| 2003/0208611 | A1 * | 11/2003 | Weber et al. .................. 709/230 |
| 2006/0190755 | A1 * | 8/2006 | Kim ................................ 713/400 |
| 2008/0045166 | A1 * | 2/2008 | Koch et al. ................. 455/127.5 |

OTHER PUBLICATIONS

Tsuguo Kobayashi et al., "Self-Adjusting Threshold Voltage Scheme (SATS) for Low-Voltage High Speed Operation," IEEE 1994 Custom Integrated Circuits Conference, pp. 271-274 (1994).

(Continued)

*Primary Examiner* — Rexford N Barnie
*Assistant Examiner* — Thienvu V Tran
(74) *Attorney, Agent, or Firm* — Law Offices of Maximilian R. Peterson

(57) ABSTRACT

A PLD includes at least one IP block or circuit, and at least one I/O block or circuit. The performance of the at least one IP block is adjusted in order to meet at least one performance characteristic by changing a supply level of the at least one IP block, by adjusting at least one body bias level of the IP block, or both. The performance of the at least one I/O block is adjusted by changing a supply level of the at least one I/O block, by adjusting at least one body bias level of the I/O block, or both.

22 Claims, 17 Drawing Sheets

OTHER PUBLICATIONS

Tadahiro Kuroda et al., "FA 10.3: A 0.9V 150MHz 10mW 4mm² 2-D Discrete Cosine Transform Core Porcessor with Variable-Threshold-Voltage Scheme," ISSCC96, pp. 166-68 (1996).

Masayuki Miyazaki et al., "WP 25.6: A 1000-MIPS/W Microprocessor using Speed-Adaptive Threshold-Voltage CMOS with Forward Bias," 2000 IEEE Int'l Solid-State Circuits Conference, 3 pp. (2000).

Masayuki Miyazaki et al., "A Delay Distribution Squeezing Scheme with Speed-Adaptive Threshold-Voltage CMOS (SA-Vt CMOS) for Low Voltage LSIs," 6 pp. (1998).

Sherif T. Eid et al., "A Microcontroller-Based PVT Control System for a 65nm 72Mb Synchronous SRAM," 2010 ISSCC 184-85.

James Tschanz et al., "A 45nm Resilient and Adaptive Microprocessor Core for Dynamic Variation Tolerance," 2010 ISSCC 282-83.

Jinuk Luke Shin et al., "A 40nm 16-Core 128-Thread CMT SPARC SoC Processor," 2010 ISSCC 98-99.

Tae-Hyoung Kim et al., "Silicon Odometer: An On-Chip Reliability Monitor for Measuring Frequency Degradation of Digital Circuits," 43 IEEE Journal of Solid-State Circuits 874-80 (2008).

* cited by examiner

APPARATUS AND METHODS FOR ADJUSTING PERFORMANCE CHARACTERISTICS AND POWER CONSUMPTION OF PROGRAMMABLE LOGIC DEVICES

CROSS-REFERENCE TO RELATED APPLICATIONS

This application is a continuation-in-part application of U.S. patent application Ser. No. 11/006,420, titled "Apparatus and Methods for Adjusting Performance Characteristics of Programmable Logic Devices,", filed on Dec. 7, 2004, and incorporated here in its entirety.

TECHNICAL FIELD

The inventive concepts relate generally to adjusting the performance of programmable logic devices (PLDs). More particularly, the invention concerns adjusting the supply voltage/power consumption of PLDs, as well as noise reduction and isolation in PLDs.

BACKGROUND

PLDs are ubiquitous electronic devices that provide flexibility to not only designers, but also end-users. During the design cycle of an electronic circuit or system, a designer may perform a relatively large number of design iterations by simply re-programming the PLD for each design. Thus, the length and expense of the design cycle decreases compared to other alternatives. Similarly, the end-user may have a desired level of control over the functionality of a design that includes PLD(s). By programming the PLD(s) in the field or even on a real-time basis, the user can change the way the circuit or system behaves.

To accommodate increasingly complex designs, modern PLDs include a relatively large number of transistors. Furthermore, users demand ever higher performance, which results in larger operating frequencies. Consequently, the power consumption, power dissipation, die temperatures and, hence, power density (power dissipation in various circuits or blocks), of PLDs has tended to increase. The upward march of the power density, however, may make PLDs design and implementation impractical or failure-prone. A need exists for PLDs that feature adjustable performance, such as adjustable power consumption in various PLD blocks and circuits.

SUMMARY

The disclosed concepts relate to the management and control of power consumption, the provision of power to various blocks and circuits in PLDs, and the performance of those blocks and circuits and therefore the PLD overall. In one illustrative embodiment, a PLD includes at least one IP block whose performance is adjusted to meet at least one performance characteristic. The performance of the IP block is adjusted by changing a supply level of the IP block, by adjusting at least one body bias level of the IP block, or both. The PLD also includes at least one I/O block whose performance is adjusted to meet at least one performance characteristic. The performance of the at least one I/O block is adjusted by changing a supply level of the at least one I/O block, by adjusting at least one body bias level of the I/O block, or both.

In another exemplary embodiment, a method of adjusting performance of a PLD includes partitioning I/O circuitry within the PLD into a plurality of blocks. For each block in the plurality of blocks, the method also includes adjusting performance of the block by deciding whether to provide power to the block, by selecting at least one power supply level provided to the block, and/or by selecting at least one body bias level supplied to the block.

Yet another exemplary embodiment relates to adjusting the performance of a PLD that includes a plurality of IP blocks. The method includes identifying the dependence of a performance characteristic of the PLD on a performance characteristic of one or more IP blocks, and partitioning each IP block into a plurality of sub-blocks. The method also includes adjusting a performance characteristic of at least one sub-block in the plurality of sub-blocks by deciding whether to provide power to the sub-block, by selecting at least one power supply level provided to the sub-block, and/or by selecting at least one body bias level supplied to the sub-block.

BRIEF DESCRIPTION OF THE DRAWINGS

The appended drawings illustrate only exemplary embodiments of the invention and therefore should not be considered as limiting its scope. Persons of ordinary skill in the art who have the benefit of the description of the invention appreciate that the disclosed inventive concepts lend themselves to other equally effective embodiments. In the drawings, the same numeral designators used in more than one drawing denote the same, similar, or equivalent functionality, components, or blocks.

DETAILED DESCRIPTION

The inventive concepts contemplate apparatus and associated methods for PLDs that feature adjustable supply voltage (and, hence, power consumption and performance), reduced noise levels, and noise isolation. The inventive concepts help to overcome excessive power density levels that conventional PLDs suffer. Moreover, one may adjust the performance level of a desired portion, circuit, or block (or all circuits and blocks), of a PLD according to the invention. Put another way, one may adjust the performance by programming the supply voltage and the attendant power dissipation of the circuitry within the PLD with a desired level of granularity, ranging from individual circuit blocks, all the way to the entire PLD circuitry.

More specifically, and as described below in detail, the inventive concepts contemplate controlling the supply voltage and power consumption of one or more circuits or blocks of circuits within the PLD by using a variable impedance circuit. In addition, one may use the variable impedance circuit to form a filter that, simultaneously with the adjustment of the power consumption, tend to reduce the noise levels present within the PLD. The reduced noise levels help to protect sensitive circuitry within the PLD from adverse effects of electrical noise. Furthermore, one may protect noise-sensitive circuitry within the PLD by using deep n-well structures within the PLD that help to isolate the sensitive circuitry from sources of electrical noise.

The inventive concepts provide the following benefits over traditional implementations. First, they allow trading off performance and power consumption or optimizing the performance-power consumption tradeoff. Second, one may selectively set, program, or adjust the supply voltage and power consumption in critical circuit paths or parts of the PLD so as to increase their performance as desired. Conversely, one may selectively set, program, or adjust the supply voltage and power consumption in non-critical circuit paths or parts of the PLD to levels commensurate with their desired performance.

One may also employ the inventive concepts to prevent (or reduce the probability of) thermal runaway. More specifically, in a traditional PLD, circuits operating at relatively high speeds tend to consume more power, resulting in temperature increase of the PLD. The increased power consumption may in turn cause those circuits to consume more power. This positive feedback mechanism may increase the power densities to unsafe or destructive levels. In PLDs according to the invention, one may adjust or control the supply voltage and power consumption levels of various blocks and, hence, reduce the likelihood of thermal runaway. Furthermore, the inventive concepts help to provide better performance by reducing the noise levels within the PLD and to isolate noise-sensitive circuitry from the undesirable effects of noise.

Figure 1:
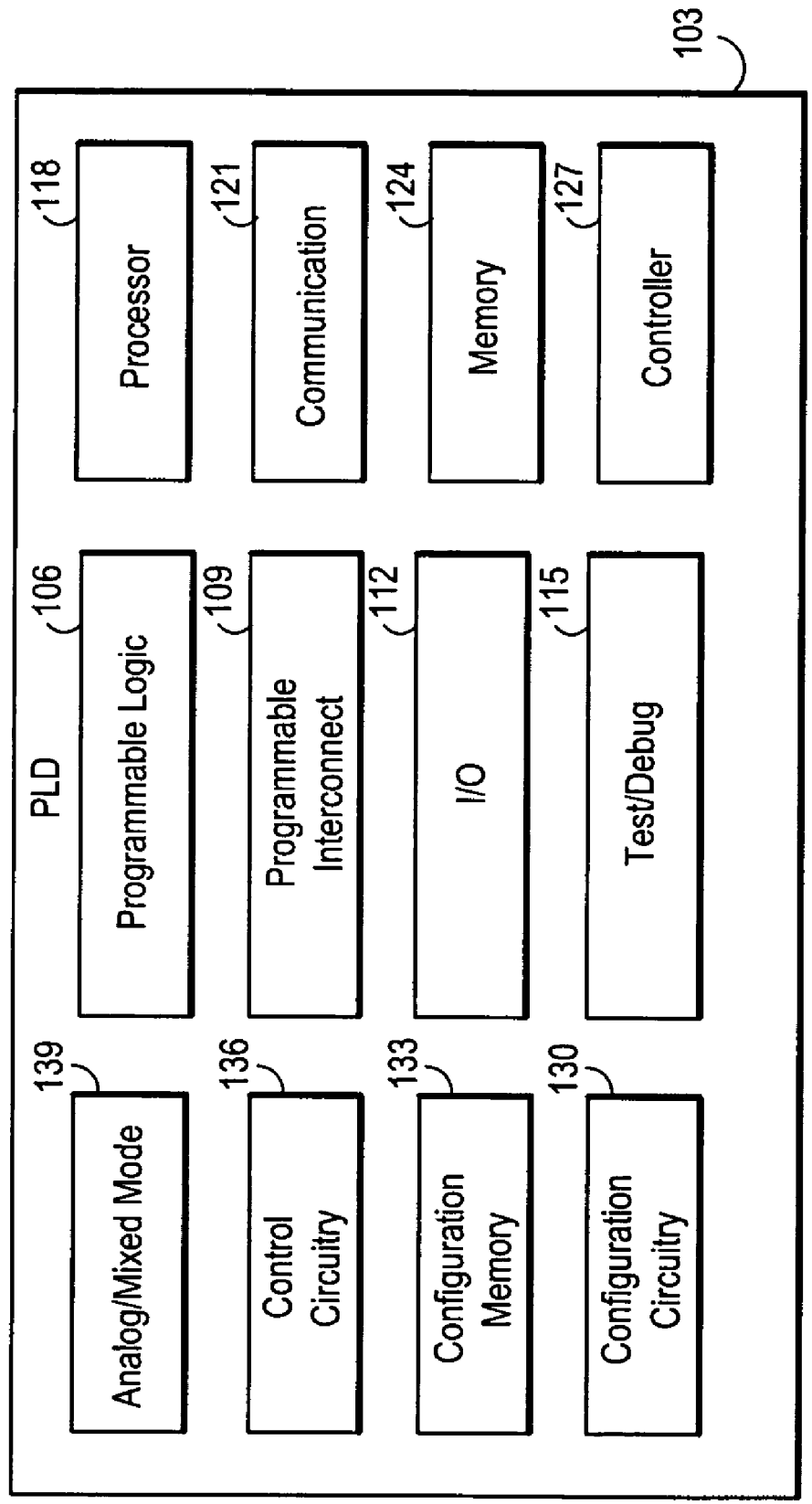
FIG. 1 shows a general block diagram of a PLD according to an illustrative embodiment of the invention.

FIG. 1 shows a general block diagram of a PLD 103 according to an illustrative embodiment of the invention. PLD 103 includes configuration circuitry 130, configuration memory 133, control circuitry 136, programmable logic 106, programmable interconnect 109, and I/O circuitry 112. In addition, PLD 103 may include test/debug circuitry 115, one or more processors 118, one or more communication circuitry 121, one or more memories 124, one or more controllers 127, as desired.

Note that FIG. 1 shows a simplified block diagram of PLD 103. Thus, PLD 103 may include other blocks and circuitry, as persons of ordinary skill in the art understand. Examples of such circuitry include clock generation and distribution circuits, redundancy circuits, and the like. Furthermore, PLD 103 may include, analog circuitry, other digital circuitry, and/or mixed-mode or mixed-signal circuitry, as desired.

Programmable logic 106 includes blocks of configurable or programmable logic circuitry, such as look-up tables (LUTs), product-term logic, multiplexers, logic gates, registers, memory, and the like. Programmable interconnect 109 couples to programmable logic 106 and provides configurable interconnects (coupling mechanisms) between various blocks within programmable logic 106 and other circuitry within or outside PLD 103.

Control circuitry 136 controls various operations within PLD 103. Under the supervision of control circuitry 136, PLD configuration circuitry 130 uses configuration data (which it obtains from an external source, such as a storage device, a host, etc.) to program or configure the functionality of PLD 103. The configuration data typically reside in configuration memory 133. The configuration data determine the functionality of PLD 103 by programming programmable logic 106 and programmable interconnect 109, as persons skilled in the art with the benefit of the description of the invention understand.

I/O circuitry 112 may constitute a wide variety of I/O devices or circuits, as persons of ordinary skill in the art who have the benefit of the description of the invention understand. I/O circuitry 112 may couple to various parts of PLD 103, for example, programmable logic 106 and programmable interconnect 109. I/O circuitry 112 provides a mechanism and circuitry for various blocks within PLD 103 to communicate with external circuitry or devices.

Test/debug circuitry 115 facilitates the testing and troubleshooting of various blocks and circuits within PLD 103. Test/debug circuitry 115 may include a variety of blocks or circuits known to persons of ordinary skill in the art who have the benefit of the description of the invention. For example, test/debug circuitry 115 may include circuits for performing tests after PLD 103 powers up or resets, as desired. Test/debug circuitry 115 may also include coding and parity circuits, as desired.

As noted above, PLD 103 may include one or more processors 118. Processor 118 may couple to other blocks and circuits within PLD 103. Processor 118 may receive data and information from circuits within or external to PLD 103 and process the information in a wide variety of ways, as persons skilled in the art with the benefit of the description of the invention appreciate. One or more of processor(s) 118 may constitute a digital signal processor (DSP). DSPs allow performing a wide variety of signal processing tasks, such as compression, decompression, audio processing, video processing, filtering, and the like, as desired.

PLD 103 may also include one or more communication circuitry 121. Communication circuitry 121 may facilitate data and information exchange between various circuits within PLD 103 and circuits external to PLD 103, as persons of ordinary skill in the art who have the benefit of the description of the invention understand. As an example, communication circuitry 121 may provide various protocol functionality (e.g., Transmission Control Protocol/Internet Protocol (TCP/IP), User Datagram Protocol (UDP) etc.), as desired. As another example, communication circuitry 121 may include network (e.g., Ethernet, token ring, etc.) or bus interface circuitry, as desired.

PLD 103 may further include one or more memories 124 and one or more controller(s) 127. Memory 124 allows the storage of various data and information (such as user-data, intermediate results, calculation results, etc.) within PLD 103. Memory 124 may have a granular or block form, as desired. Controller 127 allows interfacing to, and controlling the operation and various functions of circuitry outside the PLD. For example, controller 127 may constitute a memory controller that interfaces to and controls an external synchronous dynamic random access memory (SDRAM), as desired.

In addition to the circuitry that FIG. 1 shows, PLD 103 may include analog or mixed-mode or mixed-signal circuitry 139, sometimes known as analog or mixed-mode or mixed-signal IP blocks (e.g., blocks of circuits, modules, sub-modules, sub-circuits, groups of transistors, etc.). For example, PLD 103 may include amplifiers, digital-to-analog converters, analog-to-digital converters, filters, and the like. By their nature, analog/mixed-mode circuits tend to exhibit sensitivity to noise. As described below in detail, the inventive concepts help to isolate noise-sensitive circuitry from noise-generating circuitry. Furthermore, the inventive concepts include techniques that tend to reduce the noise levels present in PLDs.

Figure 2:
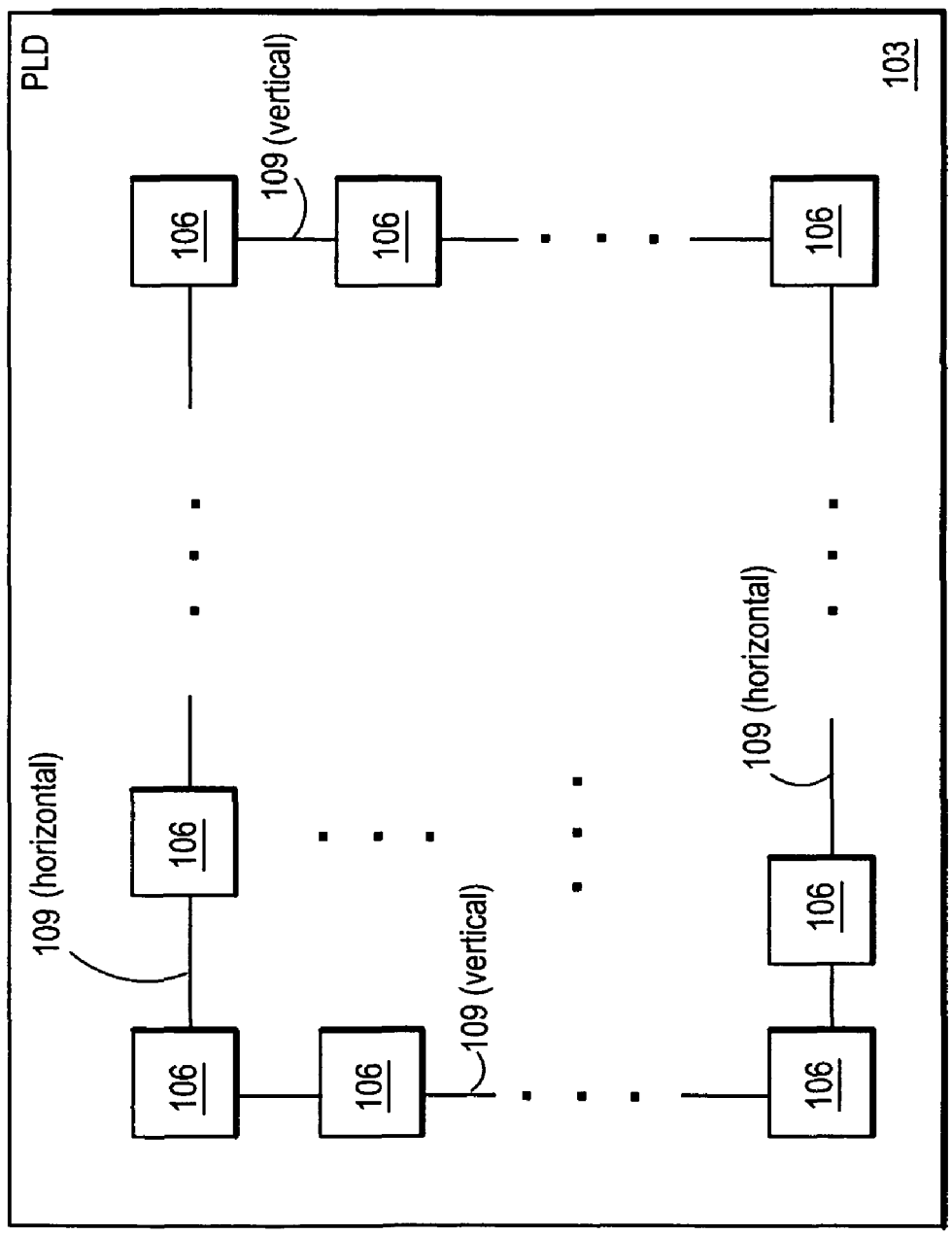
FIG. 2 illustrates a floor-plan of a PLD according to an exemplary embodiment of the invention.

FIG. 2 shows a floor-plan of a PLD 103 according to an exemplary embodiment of the invention. PLD 103 includes programmable logic 106 arranged as a two-dimensional array. Programmable interconnect 109, arranged as horizontal interconnect and vertical interconnect, couples the blocks of programmable logic 106 to one another.

One may adjust the supply voltage and, hence, the power dissipation level, of each block of programmable logic 106, each segment of programmable interconnect 109, or both, as desired. Furthermore, one may adjust the supply voltage and the power dissipation level of a portion of one or more blocks of programmable logic 106, a portion of programmable interconnect 109, or both, as desired.

In illustrative embodiments, PLDs according to the invention have a hierarchical architecture. In other words, each block of programmable logic 106 in FIG. 2 may in turn include smaller or more granular programmable logic blocks or circuits. One may adjust the supply voltage and power consumption or dissipation in each level of the hierarchical architecture of the PLD, as desired.

Figure 3:
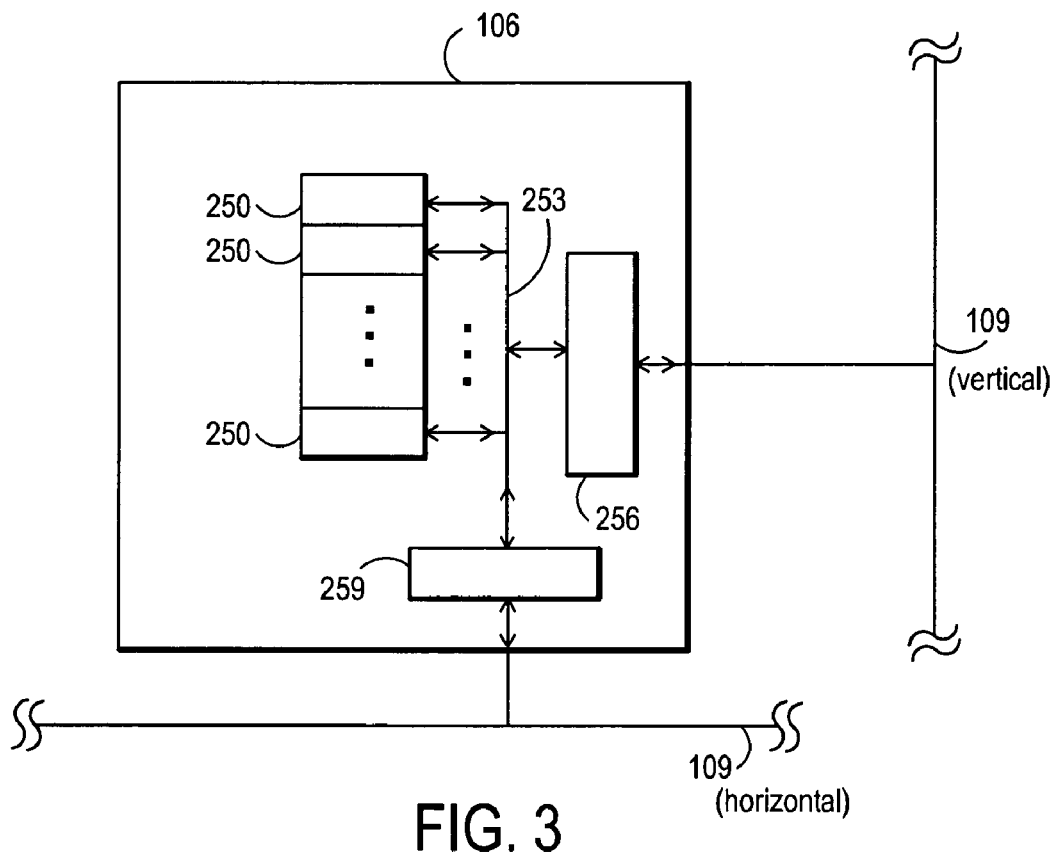
FIG. 3 depicts a block diagram of an exemplary embodiment of programmable logic in a PLD according to the invention.

FIG. 3 shows a block diagram of an exemplary embodiment of programmable logic 106 in a PLD according to the invention. Programmable logic 106 includes logic elements or programmable logic circuits 250, local interconnect 253, interface circuit 256, and interface circuit 259. Logic elements 250 provide configurable or programmable logic functions, for example, LUTs, registers, product-term logic, etc., as persons of ordinary skill in the art who have the benefit of the description of the invention understand. Local interconnect 253 provides a configurable or programmable mechanism for logic elements 250 to couple to one another or to programmable interconnect 109 (sometimes called "global interconnect"), as desired.

Interface circuit 256 and interface circuit 259 provide a configurable or programmable way for programmable logic 106 block of circuitry to couple to programmable interconnect 109 (and hence to other programmable logic 106, as FIG. 2 shows). Interface circuit 256 and interface circuit 259 may include multiplexers (MUXs), registers, buffers, drivers, and the like, as persons of ordinary skill in the art who have the benefit of the description of the invention understand.

One may adjust the supply voltage and power consumption of each portion or block of circuitry within PLD 103 (see FIGS. 1-3), as desired. Furthermore, one may adjust the supply voltage and power consumption of each portion or block of circuitry independently of others, on an individual or collective basis, as desired. Within each portion or block of circuitry, one may adjust the supply voltage and power consumption of each sub-block, or groups of sub-blocks, as desired.

For example, one may adjust the supply voltage and power consumption of all or a portion of the following circuitry within a PLD according to exemplary embodiments of the invention: one or more of the blocks in FIG. 1 (e.g., programmable logic 106, programmable interconnect 109, etc.); one or more logic elements 250 within one or more programmable logic blocks 106; one or more interface circuits 256 and/or 259, within one or more programmable logic blocks 106; one or more local interconnect within one or more programmable logic 106; and one or more MUXs, drivers, buffers, etc., within one or more interface circuits 256 and/or 259.

As noted above, one may make the supply voltage and power consumption adjustments in any desired level of granularity. In other words, one may make the adjustments applicable to sub-blocks, blocks, regions, or the entire PLD, as desired, and as applicable. For example, one may make supply voltage and power consumption adjustments to one or more of such elements of the PLD independently of one or more of other elements within the PLD, as desired. As persons of ordinary skill in the art with the benefit of the description of the invention understand, one may adjust the supply voltage and power consumption of some parts of a PLD and yet provide a fixed or default supply voltage and power consumption for other parts of the PLD, as desired.

Figure 4:
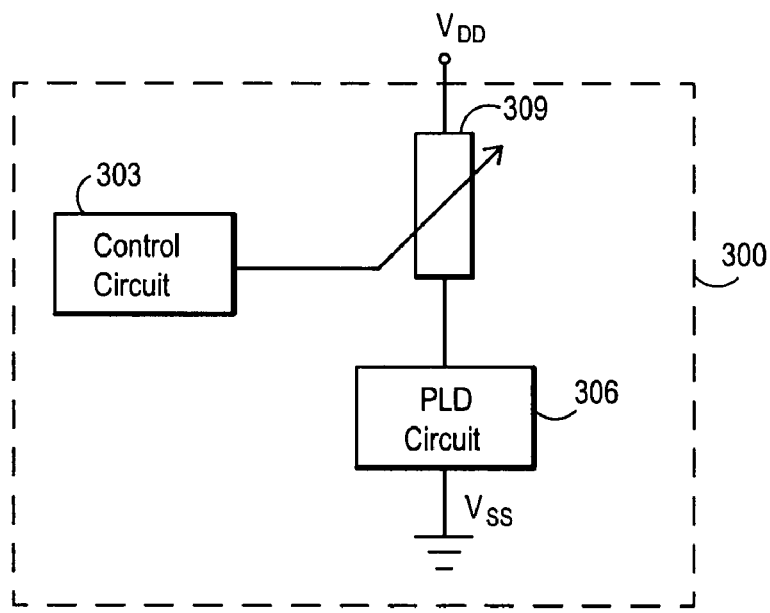
FIG. 4 shows a circuit arrangement for adjusting the supply voltage of a desired circuit in a PLD according to an exemplary embodiment of the invention.

FIG. 4 shows a circuit arrangement for adjusting the supply voltage and, hence, the power consumption of a desired circuit in a PLD according to an exemplary embodiment of the invention. More specifically, the circuit arrangement in FIG. 4 shows a controlled PLD circuit 300 that includes control circuit 303, PLD circuit 306, and variable impedance device 309.

The circuit operates as follows: In response to one or more signals not shown explicitly in FIG. 4 (such as a bias signal and configuration signals, described in connection with FIG. 13) circuit 303 applies a corresponding control signal (or signals, depending on the nature of variable impedance device 309) so as to cause adjustment of the supply voltage that variable impedance device 309 provides to PLD circuit 306. Consequently, control circuit 303 can cause the adjustment of the power consumption (and other performance criteria, such as operating speed) of PLD circuit 306.

Variable impedance device 309 couples the supply voltage, $V_{DD}$, to PLD circuit 306. When variable impedance device 309 has a relatively high impedance, PLD circuit 306 conducts relatively little current, and has a nearly zero supply voltage. Thus, PLD circuit 306 effectively shuts down or enters an OFF state or sleep mode. In this state, PLD circuit 306 consumes nearly zero power.

At the other extreme, when variable impedance device 309 has a relatively low impedance, PLD circuit 306 receives nearly the voltage $V_{DD}$ as its supply voltage (minus any drop across variable impedance device 309). In this state, PLD circuit 306 typically has higher power consumption, but also higher speed. Thus, by varying the effective supply voltage of PLD circuit 306 between the two extremes of near-zero and near-$V_{DD}$ supply voltages, one may trade off its various performance measures, such as power consumption and speed.

PLD circuit 306 may constitute any desired region, block, circuitry, sub-block, or collection of each of those parts, of a PLD. For example, PLD circuit 306 may constitute one or more of the elements shown in FIGS. 1-3, such as programmable interconnect 109, logic elements 250, etc., as desired.

As described below in detail, control circuit 303 may operate under the supervision of one or more other parts of the PLD, or under the control of an external source, or a combination of internal and external sources, as desired. Control circuit 303 causes the impedance of the variable impedance device to change. As a result, the effective supply voltage provided to PLD circuit 306 varies. The effective supply voltage of PLD circuit 306 affects its characteristics, such as operating speed, power consumption, and the like. By adjusting the supply voltage level for PLD circuit 306, one may trade off its various characteristics, such as speed versus power consumption.

Variable impedance device 309 may constitute a desired type of device, depending on factors such as the particular PLD implementation, circuit and process technology, and the like, as persons of ordinary skill in the art who have the benefit of the description of the invention understand. As one example, variable impedance device 309 may constitute a transistor.

Figure 5:
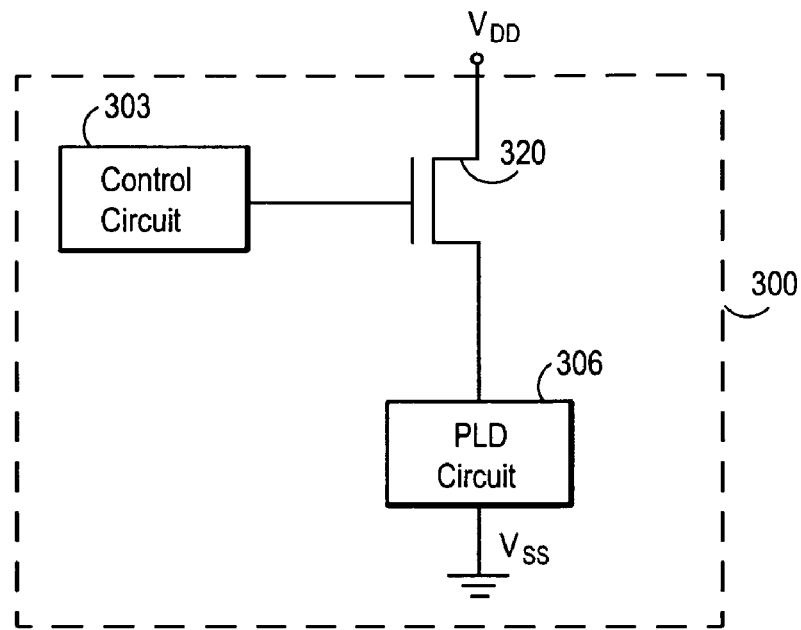
FIG. 5 illustrates another circuit arrangement for adjusting the supply voltage of a desired circuit in a PLD according to an exemplary embodiment of the invention.

FIG. 5 illustrates another circuit arrangement for adjusting the supply voltage of a desired circuit in a PLD according to an exemplary embodiment of the invention. The circuit arrangement in FIG. 5 is similar to the circuit in FIG. 4. FIG. 5, however, uses a transistor 320 and, more particularly, a metal oxide semiconductor field effect transistor (MOSFET) transistor, as a particular type of variable impedance device.

Depending on factors such as the particular PLD implementation, circuit and process technology, and the like, as persons of ordinary skill in the art who have the benefit of the description of the invention understand, transistor 320 may constitute a variety of devices, such as bipolar junction transistors (BJTs), bipolar hetero-junction transistor (BHT), and the like.

In one embodiment implemented using metal oxide semiconductor (MOS) or complementary MOS (CMOS) technology, transistor 320 may constitute a native transistor, as desired. Native transistors may have a negative or small threshold voltage, $V_T$, thus making biasing or driving transistor 320 easier in situations where a relatively small $V_{DD}$ results in a small headroom in the output voltage of control circuit 303.

As noted above, PLDs according to the invention may include noise-sensitive analog or mixed-mode or mixed-signal circuitry. One may use filtering techniques to help reduce the overall noise in the PLD or the noise level that the analog or mixed-mode circuitry experiences.

Figure 6:
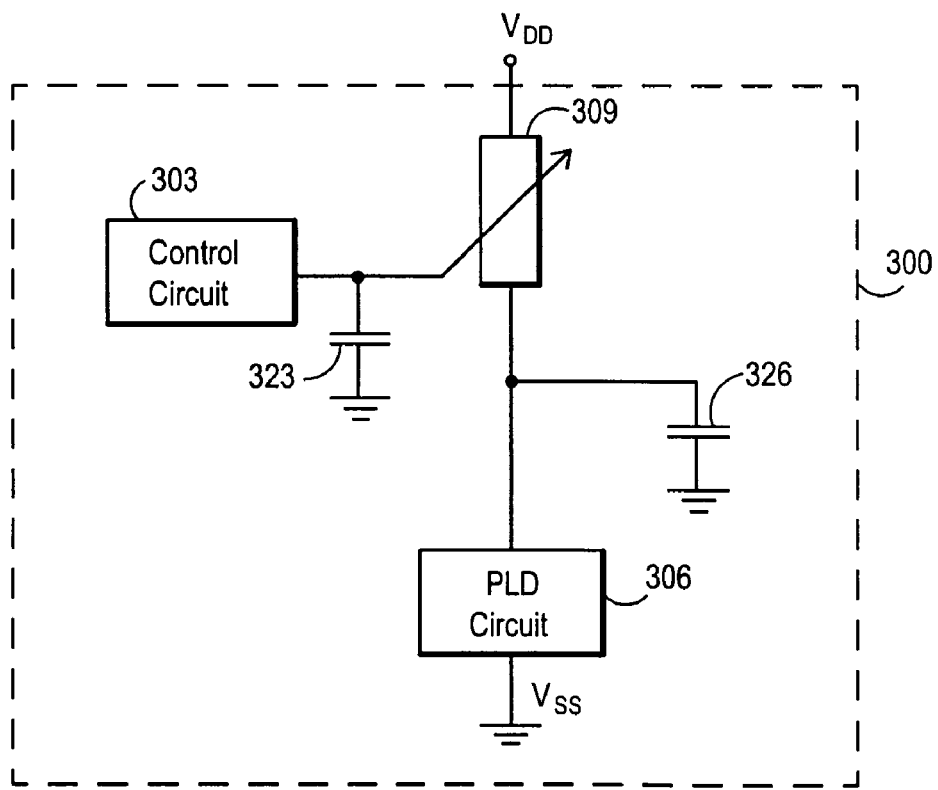
FIG. 6 depicts a circuit arrangement for reducing the noise level in a PLD according to an exemplary embodiment of the invention.

FIG. 6 depicts a circuit arrangement for reducing the noise level in a PLD according to an exemplary embodiment of the invention. Controlled PLD circuit 300 in FIG. 6 is analogous to the circuit shown in FIG. 4, and provides similar benefits. Thus, the circuitry in FIG. 6 provides the capability of controlling the supply voltage and, hence, the performance, of PLD circuit 306, as described above in detail. In the circuit of FIG. 6, PLD circuit 306 constitutes a circuit with relatively high sensitivity to noise, such as an analog or mixed-mode circuit.

In addition to the elements shown in FIG. 4, the circuit arrangement in FIG. 6 includes capacitor 323 and capacitor 326. Together with various impedances present in the circuit, each of those capacitors forms a filter. For example, capacitor 326, together with the parallel impedance of variable impedance device 309 and PLD circuit 306, forms a low-pass filter. By filtering higher frequencies, the low-pass filters tend to reduce the overall noise level that PLD circuit 306 experiences. Note that one may omit one of capacitors 323 and 326, depending on factors such as the desired level of filtering, the size and value of components, and the like, as persons of ordinary skill in the art who have the benefit of the description of the invention understand.

Figure 7:
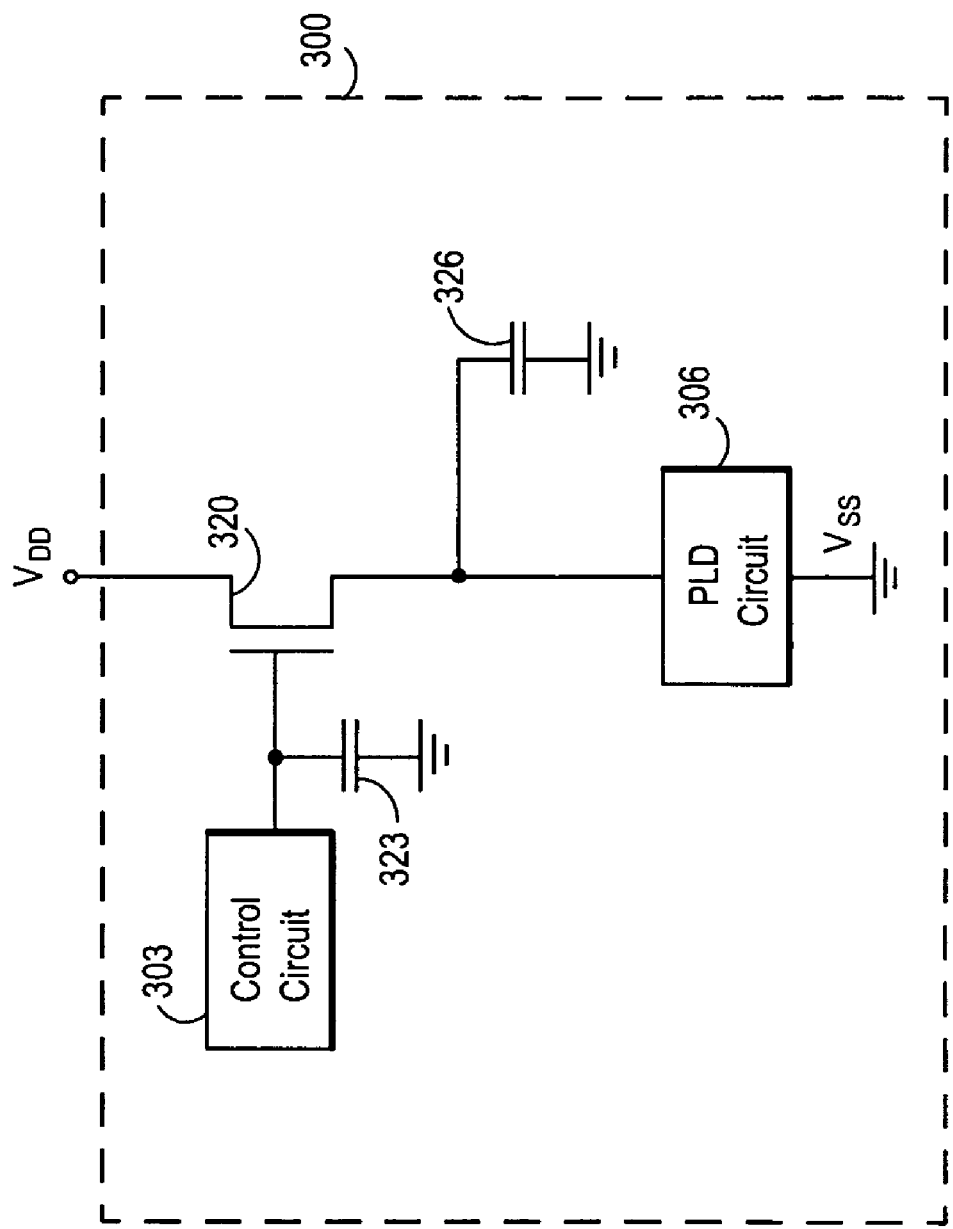
FIG. 7 shows another circuit arrangement for reducing the noise level in a PLD according to an exemplary embodiment of the invention.

FIG. 7 shows another circuit arrangement for reducing the noise level in a PLD according to an exemplary embodiment of the invention. The circuit arrangement in FIG. 7 constitutes a more specific implementation of the circuit in FIG. 6. More specifically, rather than a general variable impedance device 309 in FIG. 6, the circuit arrangement in FIG. 7 uses transistor 320. Transistor 320 may generally constitute any of the devices described above with respect to FIG. 5, as desired. Note that, as described above, one may omit one of capacitors 323 and 326, depending on factors such as the desired level of filtering, the size and value of components, and the like, as persons of ordinary skill in the art who have the benefit of the description of the invention understand.

Figure 8:
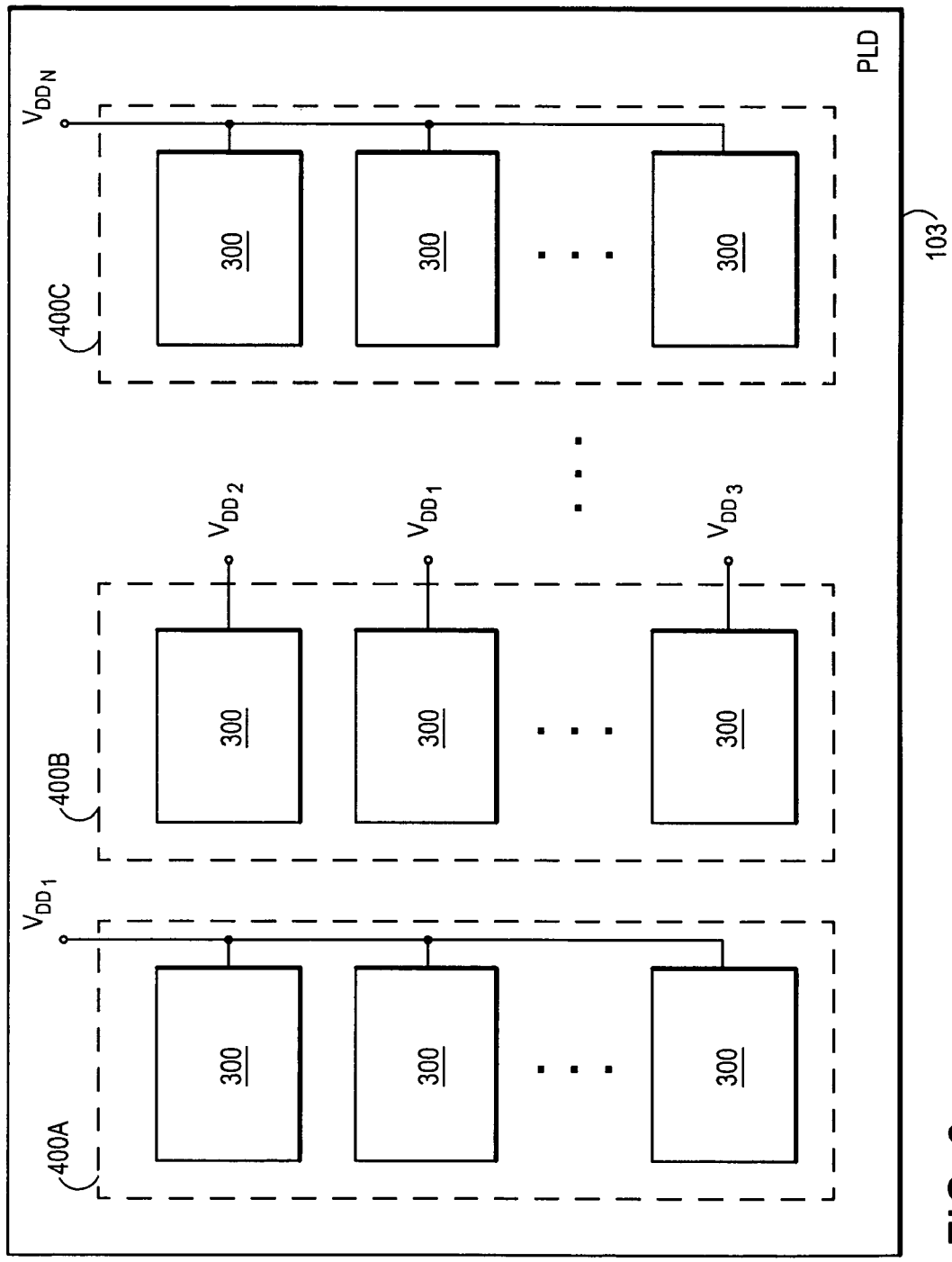
FIG. 8 illustrates an arrangement for providing a flexible mechanism for adjusting the performance of the various parts of a PLD according to an exemplary embodiment of the invention.

Using controlled PLD circuit 300 described above, one may adjust the supply voltage and power consumption and thus performance of various parts of PLDs. FIG. 8 shows an arrangement for providing a flexible mechanism for adjusting the performance of the various parts of a PLD 103 according to an exemplary embodiment of the invention. PLD 103 includes one or more PLD circuit regions or "islands" 400A-400C. Each PLD circuit region 400A-400C includes one or more controlled PLD circuits 300, as described above.

Each of PLD circuit regions 400A-400C may receive one or more power supply voltages, labeled as $V_{DD1}$-$V_{DDN}$. As examples, PLD circuit region 400A receives $V_{DD1}$, whereas circuit region 400B receives $V_{DD1}$-$V_{DD3}$, and circuit region 400C receives $V_{DDN}$. Each of controlled PLD circuits 300 can adjust the supply voltage provided to its respective PLD circuit 306 (see, for example, FIG. 4), as described above in detail.

By assigning a desired set of power supply voltages to each of PLD circuit regions 400A-400C, one may adjust the supply voltage and power consumption of circuitry within the circuit regions. Furthermore, by including a desired set of controlled PLD circuits 300 within a given circuit region 400A-400C, one may match the type of supply voltage adjustment in each circuit region 400A-400C with one or more suitable controlled PLD circuits 300. Thus, the arrangement in FIG. 8 provides a flexible mechanism for allocating various PLD resources to implementing an appropriate part of the user's design or system so as to provide an efficient implementation with improved performance adjustment capabilities and better overall performance (e.g., speed-power consumption tradeoff).

Figure 9A:
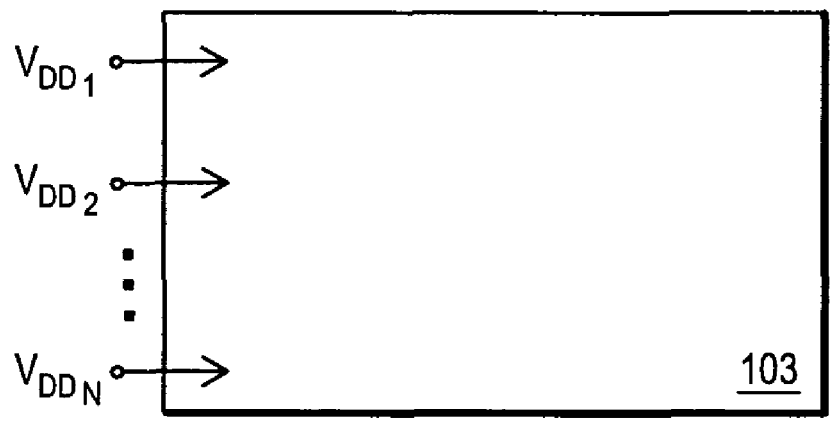
FIGS. 9A-9C depict circuit arrangements for distributing and generating power supply voltages in PLDs according to exemplary embodiments of the invention.
Figure 9B:
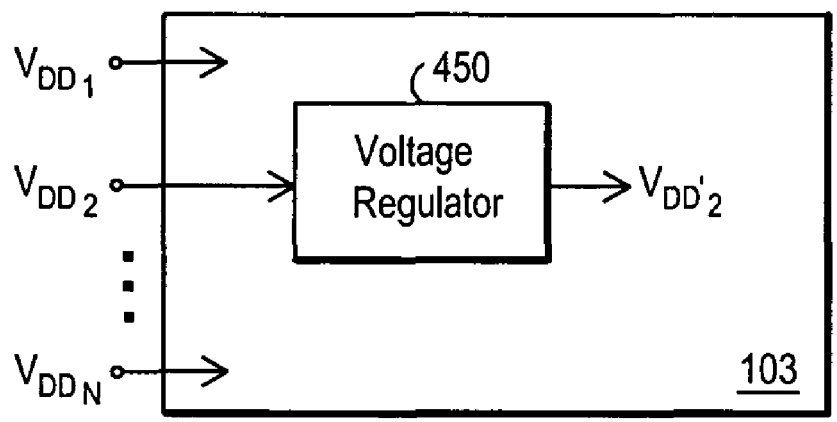
Figure 9C:
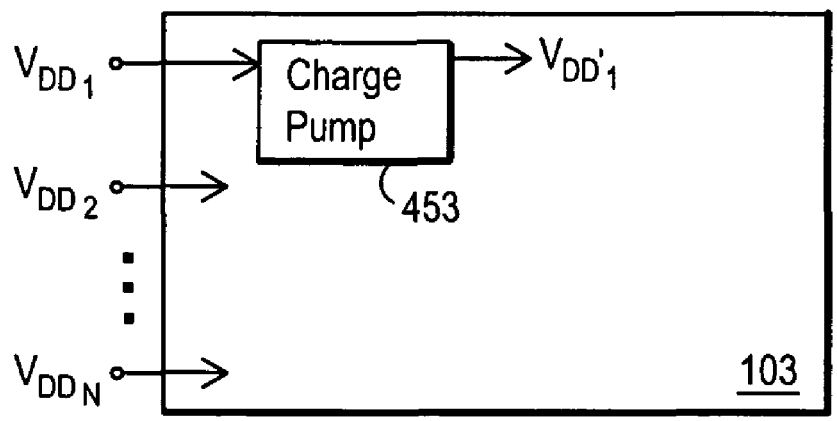

Note that, in addition to, or rather than, receiving external power supply voltages (e.g., $V_{DD1}$-$V_{DDN}$ in FIG. 8), PLD 103 may generate power supply voltages internally, as desired. FIGS. 9A-9C show circuit arrangements for distributing and generating power supply voltages in PLDs according to exemplary embodiments of the invention.

In FIG. 9A, PLD 103 simply uses the external power supply voltages that it receives, e.g., $V_{DD1}$-$V_{DDN}$. In this scenario, PLD 103 may use a power distribution and supply voltage adjustment scheme, such as the arrangement in FIG. 8.

In FIG. 9B, PLD 103 receives power supply voltages $V_{DD1}$-$V_{DDN}$. PLD 103 may regulate one or more of the power supply voltages to generate one or more internal power supply voltages. PLD 103 may then use the external and the internally generated powers supply voltages in a power distribution and supply voltage adjustment scheme, e.g., as shown in FIG. 8. In the particular example shown, PLD 103 uses voltage regulator 450 to generate internal power supply voltage $V_{DD2}'$ from external power supply voltage $V_{DD2}$.

In FIG. 9C, PLD 103 receives power supply voltages $V_{DD1}$-$V_{DDN}$. PLD 103 may use one or more charge pumps 453 to generate one or more internal power supply voltages. PLD 103 may then use the external and the internally generated powers supply voltages in a power distribution and supply voltage adjustment scheme, e.g., as shown in FIG. 8. In the particular example shown, PLD 103 uses charge pump 453 to generate internal power supply voltage $V_{DD1}'$ from external power supply voltage $V_{DD1}$. Internal power supply voltage $V_{DD1}'$ has a higher voltage level than $V_{DD1}$.

As noted above, the inventive concepts include techniques for isolating noise-sensitive circuits from noise-generating circuitry with the PLD. More particularly, in PLDs fabricated using CMOS technology, various PLD circuits typically reside in a number of deep n-wells. By strategically placing noise-sensitive circuits in isolated n-wells, one may shield or isolate the noise-sensitive circuits from sources of noise. Thus, one may provide islands within the PLD, each with its own supply voltage, power consumption, noise generation, and noise isolation characteristics. The islands provide a mechanism in PLDs according to the invention for providing a flexible implementation of a user's design or system.

Figure 10:
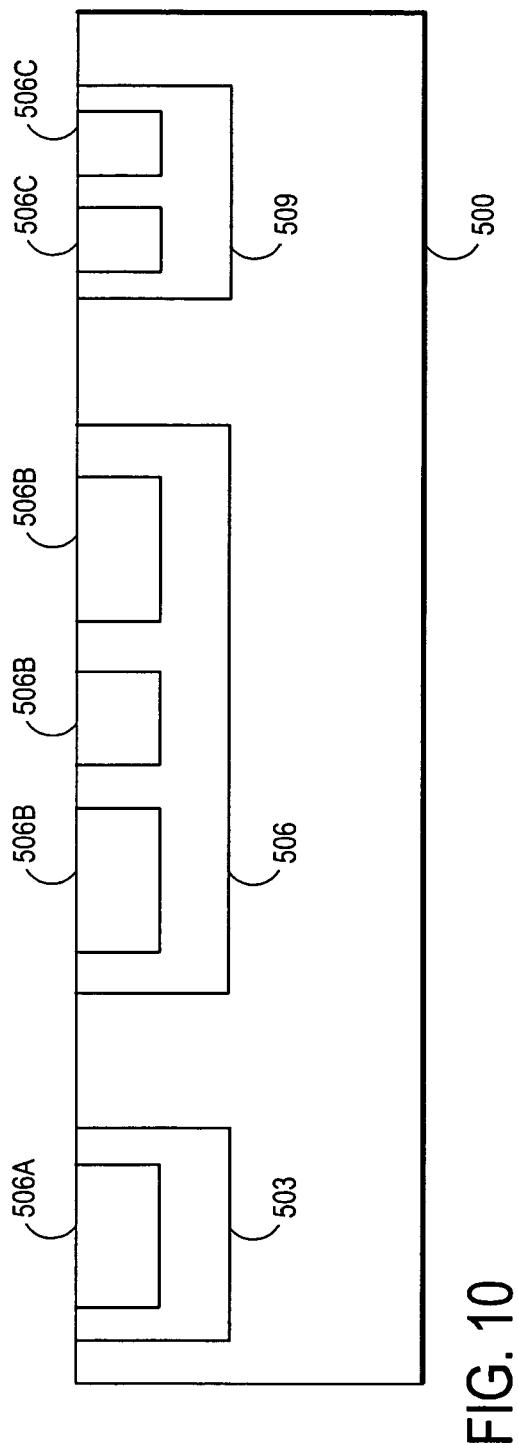
FIG. 10 shows an example of using n-wells to isolate noise-sensitive circuits in a PLD according to an illustrative embodiment of the invention.

FIG. 10 shows an example of using n-wells to isolate noise-sensitive circuits in a PLD according to an illustrative embodiment of the invention. The PLD resides in substrate 500. Substrate 500 includes deep n-wells 503, 506, and 509. Each of deep n-wells 503, 506, and 509 may include a variety of PLD circuitry, such as the circuits shown in FIGS. 1-3.

As noted, one may place the various circuits in deep n-wells 503, 506, and 509 so as to reduce interference and noise. For example, one may place circuitry with relatively high noise sensitivity (labeled as 506A) in a PLD that includes circuits that generate moderate amounts of noise (labeled as 506B) as well as circuits that produce relatively high levels of noise (labeled as 506C). As the example in FIG. 10 illustrates, one may place circuits 506A, 506B, and 506C in deep n-wells 503, 506, and 509, respectively. Noise and interference tends to decrease by the virtue of placing noise-sensitive circuit 506A farthest from the relatively high levels of noise that circuit 506C generates, but nearer to the moderate levels of noise that circuit 506B produces.

Note that deep n-wells represent an illustrative construct in a PLD fabrication technology. Depending on a number of factors, one may use other constructs and devices in current and future fabrication technologies, as persons of ordinary skill in the art who have the benefit of the description of the invention understand. The factors include the type and characteristics of the technology and the devices and constructs available, the desired design and performance specifications, cost, complexity, area efficiency, and the like.

As an example, one may use silicon-on-insulator (SOI) technology to provide noise isolation and control within PLDs. More specifically, and as persons of ordinary skill in the art who have the benefit of the description of the invention understand, SOI circuits tend to provide isolation between transistors because of the insulator layer (typically silicon dioxide). Thus, SOI circuits provide a mechanism for isolating noise-sensitive circuits from noise-generating circuits of the PLD.

Figure 11:
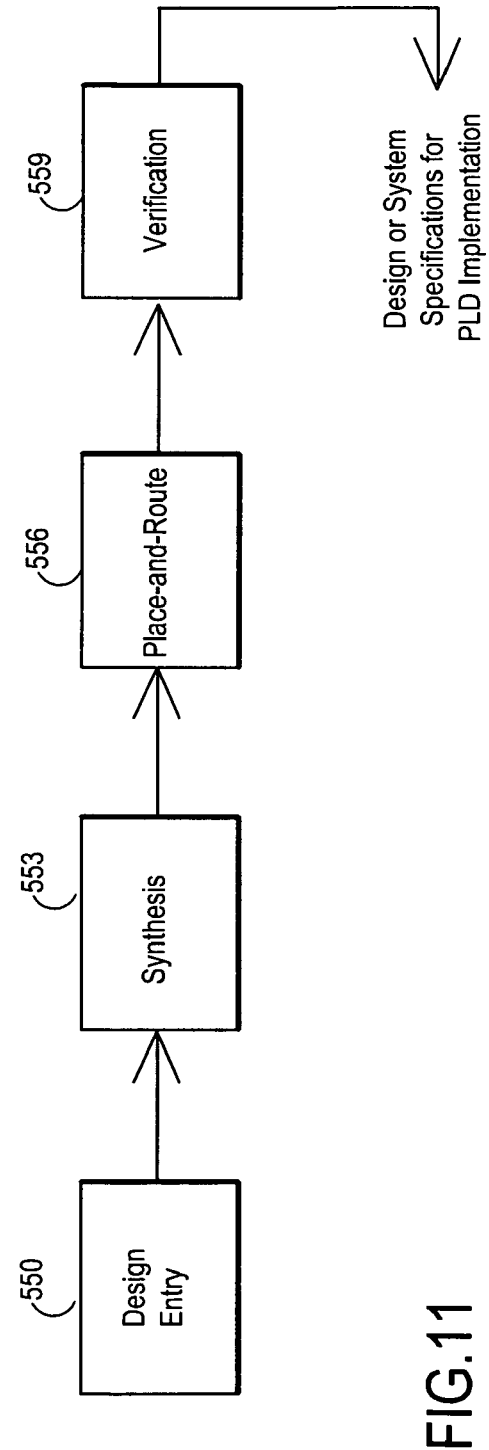
FIG. 11 illustrates various software modules that PLD computer-aided design (CAD) software according to illustrative embodiments of the invention uses.

As noted above, the user may adjust the supply voltage and power consumption and noise exposure or performance of various portions of PLDs according to the invention. The user may do so by using the software used to map a design to a PLD. FIG. 11 depicts various software modules that PLD computer-aided design (CAD) software according to illustrative embodiments of the invention uses. The modules include design-entry module 550, synthesis module 553, place-and-route module 556, and verification module 559.

Design-entry module 550 allows the integration of multiple design files. The user may generate the design files by using design-entry module 550 or by using a variety of electronic design automation (EDA) or CAD tools (such as industry-standard EDA tools), as desired. The user may enter the design in a graphic format, a waveform-based format, a schematic format, in a text or binary format, or as a combination of those formats, as desired.

Synthesis module 553 accepts the output of design-entry module 550. Based on the user-provided design, synthesis module 553 generates appropriate logic circuitry that realizes the user-provided design. One or more PLDs (not shown explicitly) implement the synthesized overall design or system.

Synthesis module 553 may also generate any glue logic that allows integration and proper operation and interfacing of various modules in the user's designs. For example, synthesis module 553 provides appropriate hardware so that an output of one block properly interfaces with an input of another block. Synthesis module 553 may provide appropriate hardware so as to meet the specifications of each of the modules in the overall design or system.

Furthermore, synthesis module 553 may include algorithms and routines for optimizing the synthesized design. Through optimization, synthesis module 553 seeks to more efficiently use the resources of the one or more PLDs that implement the overall design or system. In some embodiments, synthesis module 553 may identify critical paths within the synthesized design or system. Synthesis module 553 provides its output to place-and-route module 556.

Place-and-route module 556 uses the designer's timing specifications to perform optimal logic mapping and placement. The logic mapping and placement determine the use of routing resources within the PLD(s). In other words, by use of particular programmable interconnects with the PLD(s) for certain parts of the design, place-and-route module 556 helps optimize the performance of the overall design or system.

By proper use of PLD routing resources, place-and-route module 556 helps to meet the critical timing paths of the overall design or system. Place-and-route module 556 optimizes the critical timing paths to help provides timing closure faster in a manner known to persons of ordinary skill in the art with the benefit of the description of the invention. As a result, the overall design or system can achieve faster performance (i.e., operate at a higher clock rate or have higher throughput).

Furthermore, place-and-route module 556 adjusts the supply voltage and power consumption and the noise performance or exposure of a portion of or all of the PLD(s) that implement the design or system. Place-and-route module 556 may do so automatically, according to user-specified criteria, or a combination of the two. Place-and-route module 556 may use the user-specified criteria (for example, performance specifications, such as power dissipation, noise exposure or performance, speed, and/or current-drive capability). In addition, or instead, place-and-route module 556 may use the information about critical paths within the design or system to adjust the supply voltage(s), physical placement so as to reduce noise generation and exposure, and power consumption of parts or all of the design or system, as desired.

For example, place-and-route module 556 may adjust the supply voltage and power consumption of the critical parts of the design or system so as to achieve higher performance. Place-and-route module 556 may take into account power dissipation criteria (e.g., maximum power density) so as to trade off power and performance, as desired. Place-and-route module 556 provides the optimized design to verification module 559.

Verification module 559 performs simulation and verification of the design. The simulation and verification seek in part to verify that the design complies with the user's prescribed specifications. The simulation and verification also aim at detecting and correcting any design problems before prototyping the design. Thus, verification module 559 helps the user to reduce the overall cost and time-to-market of the overall design or system.

Verification module 559 may support and perform a variety of verification and simulation options, as desired. The options may include design-rule checking, functional verification, test-bench generation, static timing analysis, timing simulation, hardware/software simulation, in-system verification, board-level timing analysis, signal integrity analysis and electro-magnetic compatibility (EMC), formal netlist verification, noise generation and exposure, and power-consumption estimation, as desired. Note that one may perform other or additional verification techniques as desired and as persons of ordinary skill in the art who have the benefit of the description of the invention understand.

Figure 12:
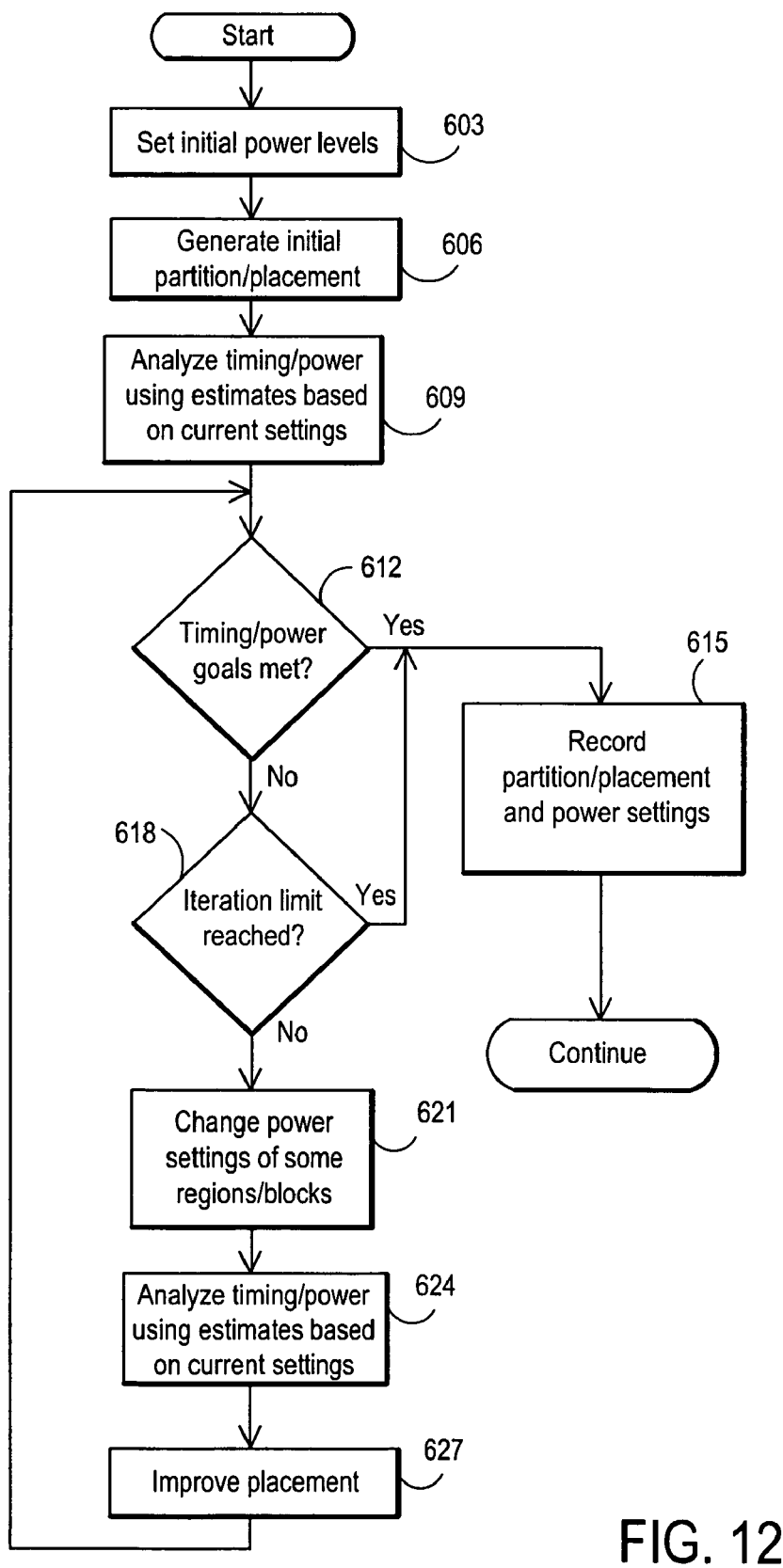
FIG. 12 depicts a flow diagram for a PLD CAD software according to an exemplary embodiment of the invention.

FIG. 12 illustrates a flow diagram for a PLD CAD software according to an exemplary embodiment of the invention. The PLD CAD shown in FIG. 12 incorporates the choice of supply voltage and power consumption for each region of the PLD into a timing-driven place-and-route CAD system. Note that, as desired, one may include criteria for noise generation, noise exposure, and/or noise isolation into the PLD CAD in FIG. 12 by making modifications that fall within the knowledge of persons of ordinary skill in the art who have the benefit of the description of the invention.

Starting the process, at 603 the PLD CAD sets initial supply voltage levels (corresponding to estimated power consumption levels). At 606 the software generates an initial placement. Then, at 609 it analyzes the timing of the circuitry using delay estimates that reflect the various settings, such as supply voltage settings. At 612 the software determines whether it has met the user's various criteria, such as timing and power goals. If so, at 615 it records the placement and supply voltage selections. If not, the software checks at 618 to determine whether it has reached the iteration limit. If so, it proceeds to 615 to record the current placement and supply voltage selections.

If the software has not reached the iteration limit, it increments the iteration count (not shown explicitly), and at 621 changes the settings of at least some regions, circuits, blocks, or parts of the PLD. At 624 it analyzes the timing of the circuitry using delay estimates that reflect the changed settings. At 356 it improves the placement of the circuit, and jumps to 612 to determine whether it has met the user's timing and power goals. Once the PLD CAD has implemented a design (i.e., synthesized, placed and routed the design), the CAD software should automatically provide data for programming the PLD that set the supply voltages of various parts of the PLD.

Figure 13:
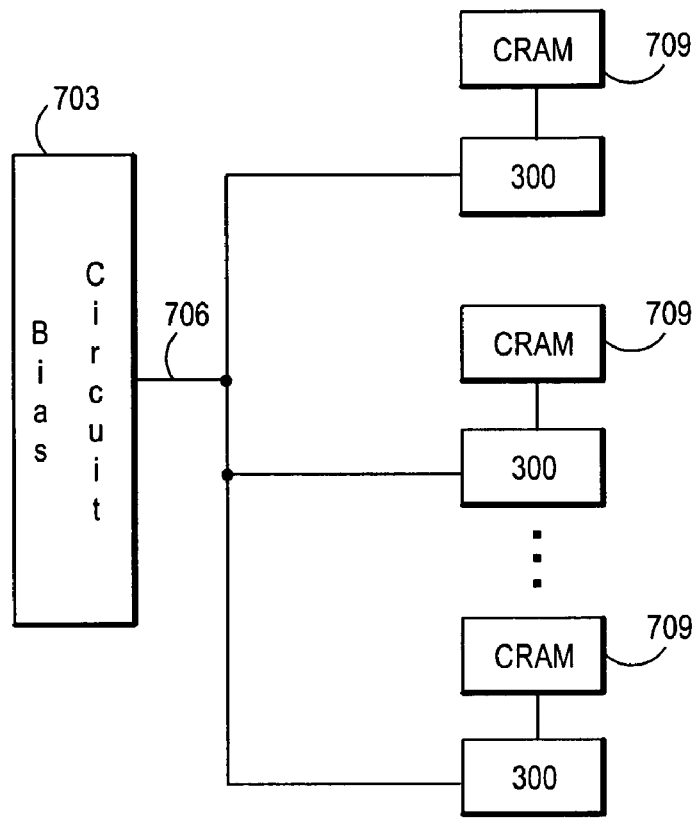
FIG. 13 shows a block diagram of circuitry within a PLD according to exemplary embodiments of the invention to adjust, program, or set the supply voltage levels of desired parts of the PLD.

FIG. 13 shows a block diagram of circuitry within a PLD according to exemplary embodiments of the invention to adjust, program, or set the supply voltage levels of desired parts of the PLD. The circuitry includes bias circuit 703, a plurality of configuration memory (configuration random-access memory, or CRAM, or other implementations of the memory) cells 709, and controlled PLD circuits 300.

Bias circuit 703 generates one or more signals 706 and provides those signal(s) to controlled PLD circuits 300 (more particularly, to control circuit 303, as shown, for example, in FIG. 4). In other word, bias circuit 703 provides one or more global bias signals to controlled PLD circuits 300. Furthermore, each of CRAM cells 709 provides to a respective one of controlled PLD circuits 300 (more particularly, to control circuit 303). The signals from CRAM cells 709 represent configuration data for the various circuits within the PLD, as provided by the PLD CAD program described above. In response to configuration data from CRAM cells 709, the control circuit (not shown explicitly) in each of controlled PLD circuits 300 generates one or more signals to control the impedance of the variable impedance device (not shown explicitly) as a function of signal(s) 706.

In other variations, each of CRAM cells 709 may provide configuration data to more than one controlled PLD circuit, as desired. Conversely, one may modify the control circuit within controlled PLD circuits 300 so as to make it responsive to configuration data from more than one CRAM cell 709, as desired.

Figure 14:
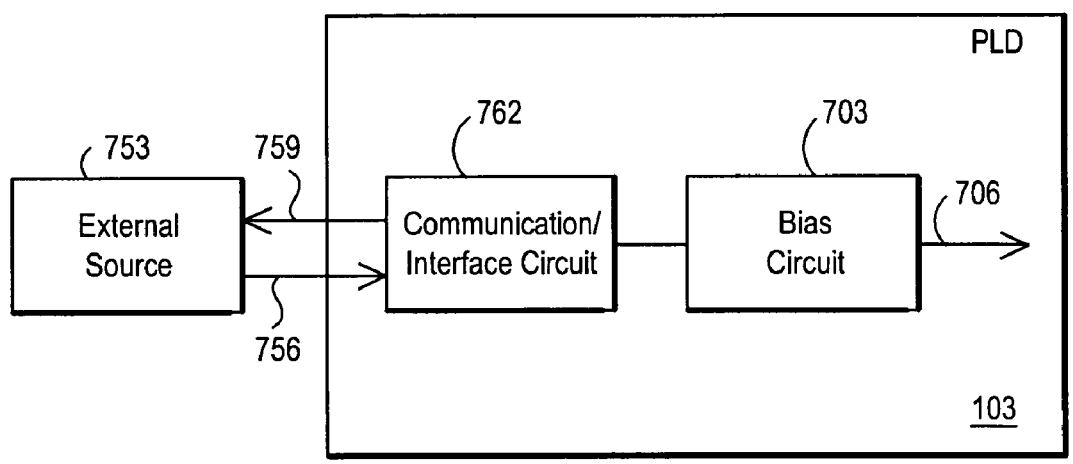
FIG. 14 illustrates a circuit arrangement according to exemplary embodiments of the invention for adjusting supply voltage levels within a PLD in response to an external source.

Note that one may adjust, program, or set supply voltage levels in response to sources external to the PLD. For example, one may communicate supply voltage levels to a PLD to adjust or modify its performance. FIG. 14 shows a circuit arrangement according to exemplary embodiments of the invention for adjusting supply voltage levels within PLD 103 in response to an external source 753. The circuit arrangement includes external source 753, communication/interface circuit 762, and bias circuit 703 (see FIG. 13).

Communication/interface circuit 762 provides a mechanism for external source 753 and bias circuit 703 to communicate and exchange information. External source 753 may provide one or more control signal(s) 756 to communication/interface circuit 762 within PLD 103. Communication/interface circuit 762 provides the information received from external source 753 to bias circuit 703. In response, bias circuit 703 generates one or more signals 706, with levels corresponding to control signal(s) 756. Communication/interface circuit 762 may provide information, such as status signals, from bias circuit 703 (or PLD 103 generally) to external source 753.

External source 753 may constitute a variety of devices, structures, or arrangements, as persons of ordinary skill in the art with the benefit of the description of the invention understand. For example, external source 753 may constitute a computer network (e.g., the Internet), a telephone-line communication link, a wireless communication link, a bus, etc., as desired.

Note that one may adjust, program, or set the supply voltage levels in PLDs on a dynamic or time-varying basis, as desired, to take into account or respond to changing conditions (for example, changes in performance specifications). As one example, referring to FIG. 14, external source 753 may update or modify control signal(s) 756 that it provides to PLD 103. Bias circuit 703 responds accordingly to the updated or modified signal(s) 756.

Figure 15:
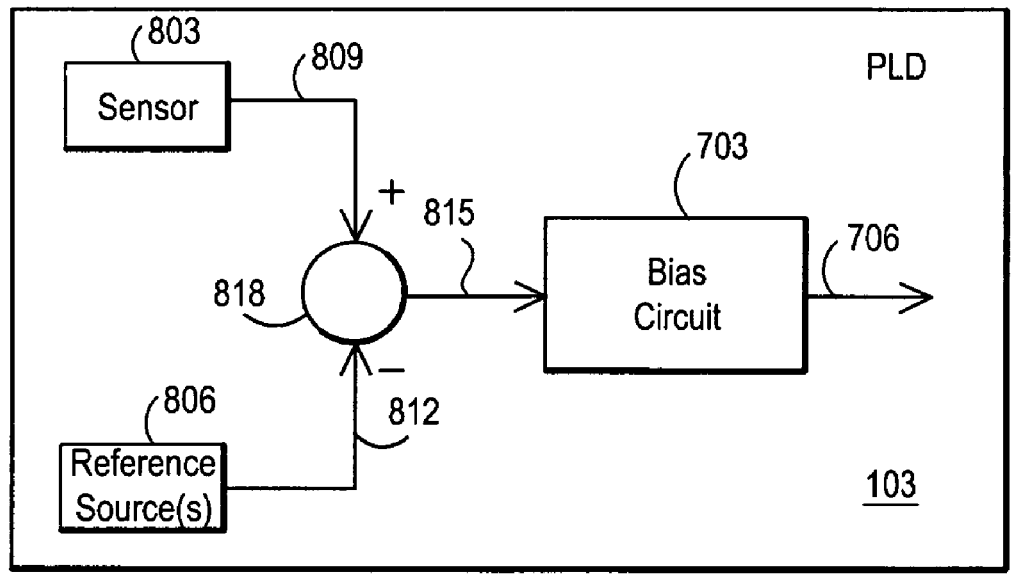
FIG. 15 depicts a circuit arrangement for adjusting supply voltage level(s) within a PLD according to exemplary embodiments of the invention.

As another example, one may change or adjust supply levels in response to changes within PLD 103 itself, for instance, a change in temperature, noise, power consumption, and the like, in one or more circuits or areas of PLD 103. FIG. 15 shows a circuit arrangement for modifying supply voltage level(s) within a PLD according to exemplary embodiments of the invention.

The circuit arrangement includes one or more sensor(s) 803, one or more reference source(s) 806, subtracter 818, and bias circuit 703. Sensor(s) 803 sense a desired parameter (e.g., temperature, noise, etc.) in one or more areas, circuits, or blocks within PLD 103 and provide signal(s) 809 to subtracter 818. Reference source(s) 806 provide reference signal(s) 812 to subtracter 818. Reference signal(s) 812 may have values that correspond to various levels of the sensed parameter.

Subtracter 818 subtracts reference signal(s) 812 from signal(s) 809 and provides difference signal(s) 815 to bias circuit 703. Difference signal(s) 815 may constitute the difference between actual sensed value(s) and the desired value(s) in one or more parts of PLD 103. In response to difference signal(s) 815, bias circuit 703 generates signal(s) 706 (see also FIG. 13).

Bias circuit 703 may use difference signal(s) 815 to generate signal(s) 706 that ultimately affect various aspects of the performance of PLD 103. For example, if difference signal(s) 815 indicate a lower sensed value (say, speed) than a threshold or maximum value, bias circuit 703 may generate signal(s) that increase supply voltage level(s) to increase operating speed of the desired parts of PLD 103. In contrast, if difference signal(s) 815 indicate a sensed level higher than a safe or maximum level, bias circuit 703 may generate signal(s) that decrease supply voltage level(s) to safe or desired levels (albeit with a decreased resulting speed).

More generally, one may implement a feedback loop that generates supply voltage level(s) so as to target specific performance criteria. Put another way, one may compare actual performance measures of a PLD to desired or specified measures or criteria and adjust, program, or set supply voltage levels accordingly.

As noted above, one aspect of the inventive concepts relates to the performance and power consumption, and their adjustment or configuration, of IP blocks within PLD 103. Broadly speaking, as noted above, PLDs according to the invention include not only digital circuitry, but also mixed-mode or mixed-signal circuitry or circuitry that is analog in nature.

Typically, the analog and/or mixed-mode or mixed-signal circuitry resides in IP block(s) within the PLD. IP blocks, as persons of ordinary skill in the art who have the benefit of the description of the invention understand, generally denote a pre-designed circuit or block. For example, an IP block might constitute a core or block of circuitry designed by another designer, group of designers, or even another organization. PLD 103 might include one or more IP block(s), as desired.

As persons of ordinary skill in the art who have the benefit of the description of the invention understand, IP blocks might include a wide variety of circuits. Examples include analog-to-digital converters (ADCs), digital-to-analog converters (DACs), data converters, various types of amplifiers, gain blocks, mixers or multipliers, phase-locked loops (PLLs), oscillators, voltage-controlled oscillators (VCOs), filters, clock sources, clock multipliers, clock recovery circuits, receivers, transmitters, transceivers, and various types of interfaces, such as high-speed serial interfaces (HSSI). Note that, generally, IP blocks might include digital circuitry and/or analog circuitry, as desired (i.e., all digital, all analog, digital and analog, mixed-mode, mixed-signal etc.).

Not only the particular type of circuitry in IP block, but also the amount or number of IP blocks, makes them relatively important from performance, noise, and power consumption perspectives. In present-day PLDs, designers or users might replicate an IP block up to 20 times across the PLD. Because of that repetition, any gains in the performance and power consumption of the IP block(s) would make a relatively large impact on the overall performance of the PLD and, hence, the circuit or system in which they reside.

Furthermore, as noted above, some of the circuitry in PLDs according to the inventive concepts uses a dedicated (or shared with similar circuits) power supply. Separate power supplies supply power to the traditional PLD fabric, e.g., programmable logic 106 and programmable interconnect 109 (see FIG. 1). The separation of the power supplies helps overcome noise and power consumption problems, as persons of ordinary skill in the art who have the benefit of the description of the invention understand.

Although one may use separate external power supplies (e.g., regulators outside the PLD's package), doing so has certain disadvantages. First, external regulators tend to increase the overall cost of the solution or system. Second, external regulators tend to increase the complexity of the design from a user's perspective because of the increased complexity of the printed circuit board and additional components.

In contrast, PLDs according to the inventive concepts contemplate integrating regulators or power supplies for IP blocks, or at least noise-sensitive portions, circuits, or parts in IP blocks, within the PLD. Integrated regulators overcome the disadvantages of external regulators.

More specifically, integrated regulators reside within the same package as the PLD's die, thus resulting in lower overall cost. Moreover, integrated regulators reduce the number of components in the bill of materials. Integrated regulators also tend to reduce coupling to nearby or other circuitry on the printed circuit board and, hence, reduce noise, coupling, or interference problems. In addition, integrated regulators tend to increase system robustness and overall reliability.

The circuitry within typical IP blocks can itself lead to special consideration in circuit and system design and, hence, affect performance and power consumption. Because of their relatively high performance specifications and goals, IP blocks tend to exhibit increased sensitivity to process, voltage-level, and power quality variations.

For example, leakage can prove detrimental to the performance of high-speed dynamic logic. Dynamic logic relies on storage of relatively small amounts of charge on a capacitor. Leakage in the circuit can cause the charge on the capacitor to reduce, and might lead to the logic circuit losing its state or having an incorrect state. The incorrect state can propagate to other circuitry and cause errors or malfunctions in the circuit or system.

Natural device-to-device variations within a given semiconductor fabrication process can lead to variations in device leakage levels. The variations might lead to reduced performance or failure of dynamic logic circuits, as described above. If the devices in question happen to reside in sensitive IP blocks or mixed-mode circuits, the PLD itself might experience problems or fail. This phenomenon would result in reduced manufacturing yield and increased costs.

As another example, device-to-device variations might lead to variations in the edge rates in driver circuits. This phenomenon adversely impacts the PLD's performance. Slow edges, for example, are more prone to jitter, while faster edges tend to result in increased power consumption and generate additional noise in the power supply for the circuit (i.e., in the power supply for the IP block or the particular part of the IP block).

In such situations, one might trade off performance and yield. In other words, by reducing performance goals, one might avoid leakage and edge rate problems and the resulting device failure and, consequently, avoid reduced yields. Conventional approaches to these problem focus on power management of particular parts of the circuitry or system. The inventive concepts provide a more general or system-level approach that includes power management considerations for the IP blocks and PLD circuitry into a higher end system for PLDs.

Figure 16:
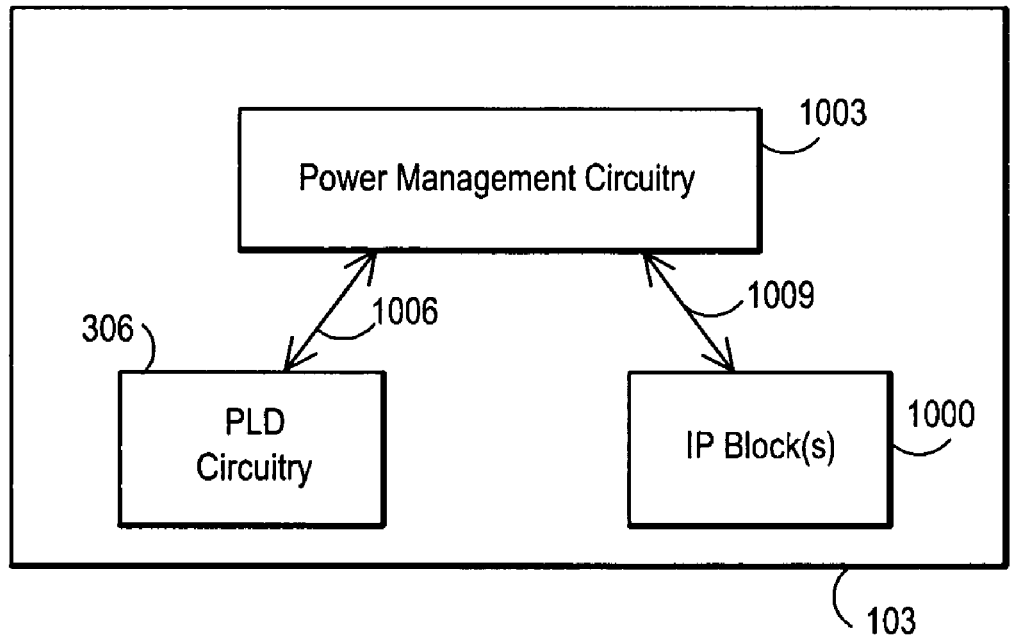
FIG. 16 shows a simplified block diagram of an exemplary embodiment of the invention for adjusting the performance of circuitry within the PLD, including IP block(s).

FIG. 16 shows a simplified block diagram of an exemplary embodiment of the invention for adjusting the performance of circuitry within the PLD, including IP block(s). The particular embodiment includes power management circuitry 1003, PLD circuitry 306, and one or more IP blocks 1000.

Power management circuitry 1003 communicates with PLD circuitry 306 via signal link 1006. Signal link 1006 might provide signal flow in one or both directions between power management circuitry 1003 and PLD circuitry 306. Generally speaking, signal link 1006 might include one of more status signals and one or more control signals, as desired. The particular implementation of signal link 1006 depends on the details of the desired performance and circuit specifications, as persons of ordinary skill in the art who have the benefit of the description of the invention understand.

Similarly, power management circuitry 1003 communicates with IP block(s) 1000 via signal link 1009. Signal link 1009 might provide signal flow in one or both directions between power management circuitry 1003 and IP block(s) 1000. Generally speaking, signal link 1009 might include one of more status signals and one or more control signals, as desired. The particular implementation of signal link 1009 depends on the details of the desired performance and circuit specifications, as persons of ordinary skill in the art who have the benefit of the description of the invention understand.

One may implement signal link 1006 and signal link 1009 in a wide variety of ways. For example, one may use individual conductors or coupling mechanisms, a bus, or the like, as desired. Again, the details of the implementation depend on the particular situation, as persons of ordinary skill in the art who have the benefit of the description of the invention understand.

Power management circuitry 1003 controls or manages the provision of power to PLD circuitry 306. Power management circuitry 1003 may set, vary, or control the voltage levels to one or more parts of PLD circuitry 306, as desired, and as described above. Power management circuitry 1003 might also cause one or more parts of PLD circuitry 306 to become disabled or hibernate, as desired, and as described above.

In addition, power management circuitry 1003 may set, vary, or control body bias levels for one or more parts of PLD circuitry 306, as desired, and as described above. As noted, body bias levels impact the performance of the affected transistors and, hence, of the overall circuit. Put simply, one may trade off speed and power consumption of the transistors and the overall circuit. More details of body bias and leakage control appear in U.S. patent application Ser. No. 10/865,402, titled "Apparatus and Methods for Adjusting Performance of Integrated Circuits," filed on Jun. 10, 2004, assigned to Altera Corporation, and incorporated here by reference in its entirety.

In a similar manner, power management circuitry 1003 controls or manages the provision of power to IP block(s) 1000. The affected parts of IP block(s) 1000 may include analog circuitry, digital circuitry, mixed-mode or mixed-signal circuitry, or combinations of them, as desired, and as persons of ordinary skill in the art who have the benefit of the description of the invention understand.

Power management circuitry 1003 may set, vary, or control the voltage levels to one or more parts of IP block(s) 1000, as desired, and as described above. Power management circuitry 1003 might also cause one or more parts of IP block(s) to become disabled or hibernate, as desired, and as described above.

Furthermore, power management circuitry 1003 may set, vary, or control body bias levels for one or more parts of IP block(s) 1000, as desired, and as described above. Body bias levels have the effect on performance of the affected transistors and the overall circuit, described above and, in more detail, in U.S. patent application Ser. No. 10/865,402, incorporated here by reference.

Note that power management circuitry 1003 may control the provision of power, voltage level(s), and body bias level(s) to PLD circuitry 306 and IP block(s) 1000 with any desired level of granularity. Thus, the level of granularity may affect individual transistors, to groups or blocks of transistors or circuits, to entire blocks, all of PLD circuitry 306, all of IP block(s) 1000, etc., as desired. The choice of the level of granularity depends on a number of factors, such as the desired performance and design specifications in a given situation, as persons of ordinary skill in the art who have the benefit of the description of the invention understand.

Figure 17:
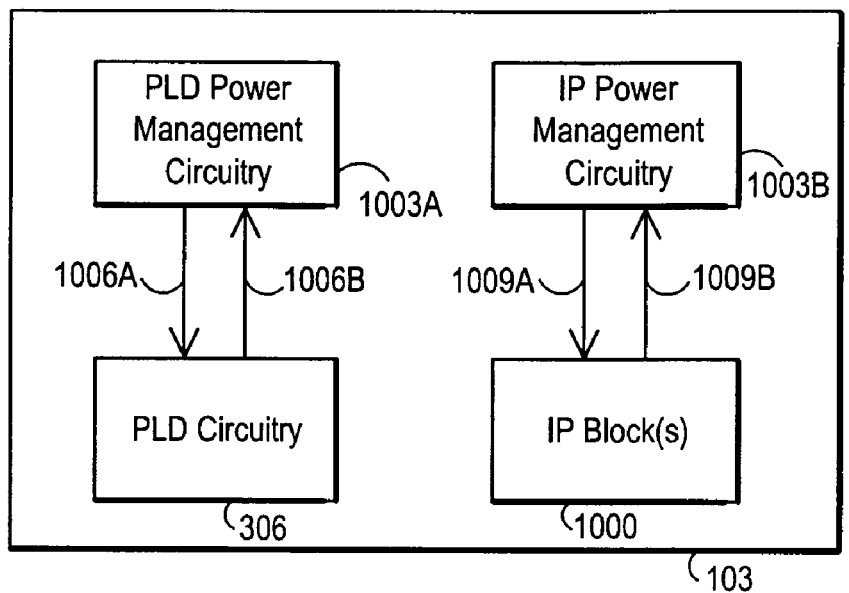
FIGS. 17-18 illustrates simplified block diagrams of other exemplary embodiments of the invention for adjusting the performance of circuitry within the PLD, including IP block(s) and input/output (I/O) circuitry.

Note that FIG. 16 provides merely one exemplary embodiment, and that many alternative embodiments according to the inventive concepts are possible, as persons of ordinary skill in the art who have the benefit of the description of the invention understand. For example, FIG. 17 illustrates a simplified block diagram of another exemplary embodiment of the invention. This embodiment includes PLD circuitry 306, IP block(s) 1000, PLD power management circuitry 1003A, and IP power management circuitry 1003B.

PLD power management circuitry 1003A communicates with PLD circuitry 306 via signal link 1006A and signal link 1006B. Signal link 1006A and signal link 1006B may be similar to the corresponding parts of signal link 1006 in FIG. 16, as desired, and as persons of ordinary skill in the art who have the benefit of the description of the invention understand. Signal link 1006A, however, provides a mechanism for communication from PLD power management circuitry 1003A to PLD circuitry 306, whereas signal link 1006B provides a way for PLD circuitry 306 to communicate with PLD power management circuitry 1003A.

Likewise, IP power management circuitry 1003B communicates with IP block(s) 1000 via signal link 1009A and signal link 1009B. Signal link 1009A and signal link 1009B may be similar to corresponding parts of signal link 1006 in FIG. 16, as desired, and as persons of ordinary skill in the art who have the benefit of the description of the invention understand. Note, however, that signal link 1009A provides a mechanism for communication from IP power management circuitry 1003B to IP block(s) 1000. Signal link 1009B, on the other hand, provides a way for IP block(s) 1000 to communicate with IP power management circuitry 1003B.

Generally speaking, the embodiment in FIG. 17 operates in a like manner and achieves similar goals as does the embodiment in FIG. 16. By providing individualized control of power management functions for PLD circuitry 306 and IP block(s) 1000, however, the embodiment in FIG. 17 allows for finer control over the power control and performance of PLD circuitry 306 and IP block(s) 1000 and, hence, of PLD 103 overall.

As an example, the embodiment in FIG. 17 provides the capability for either the PLD CAD software (see FIG. 11) and/or the user to have finer control over the power consumption, power supply, and performance of one or more PLD circuits 306 and/or one of more IP block(s) 1000. As another example, one may provide power management capability to the PLD CAD software but to the user, or vice-versa, for PLD circuitry 306 and/or IP block(s) 1000.

IP power management circuitry 1003B (or PLD power management circuitry 1003) may control and manage the power consumption and performance of IP blocks 1000 with a desired level of granularity. Thus, generally speaking, one may control the provision of power to a wide range of circuits in PLDs, ranging from a single-transistor circuit, to blocks of transistors, blocks of circuitry, etc., as desired. Similarly, one may adjust or tune one or more supply voltages to circuits ranging from a single-transistor circuit, to blocks of transistors, blocks of circuitry, etc., as desired. Finally, one may adjust or tune the body bias level(s) in circuitry ranging from a single-transistor circuit, to blocks of transistors, blocks of circuitry, etc., as desired.

Figure 18:
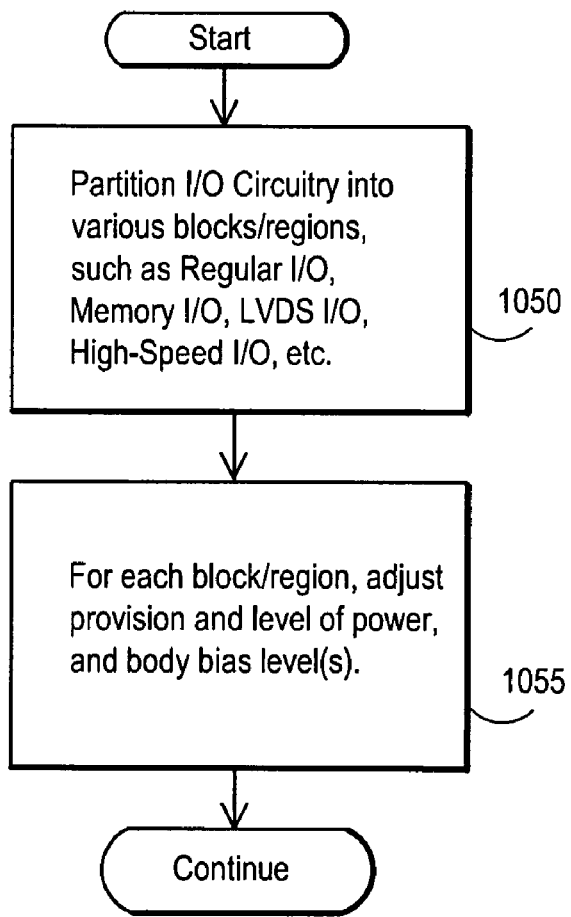

One may characterize PLDs according to the invention according to their adjusted performance. FIG. 18 shows a simplified flow diagram for a method of adjusting the performance of I/O blocks or circuits in PLDs. Note that some I/O circuits constitute IP blocks, whose performance adjustment falls within the scope of the inventive concepts relating to adjustment of the performance of IP blocks generally.

At 1050, one partitions I/O circuitry into various blocks, regions, or sub-blocks. Examples include regulator I/O circuitry, LVDS I/O circuitry, high-speed I/O circuitry, such as transceivers, memory I/O circuitry, etc. At 1055, for each I/O block or region, one adjusts the provision and level of power, as well as the body bias level(s).

More specifically, one may disable (e.g., by providing no power) unused I/O blocks or circuits (i.e., blocks not used in the user's circuit). In addition, for I/O blocks used in the user's circuit, one may adjust or tune power supply level(s), depending on factors such as the level of performance desired, the level of noise generated by the block or circuit, the susceptibility of that block or circuit to noise, and/or the power consumption goals for that block, etc.

Moreover, one may adjust body bias level(s) for each of the I/O blocks. More specifically, one may adjust the body bias level(s) for the transistors in each I/O block, depending on factors such as described above. Note that, as described above, one may apply the above techniques with a desired level of granularity.

Figure 19:
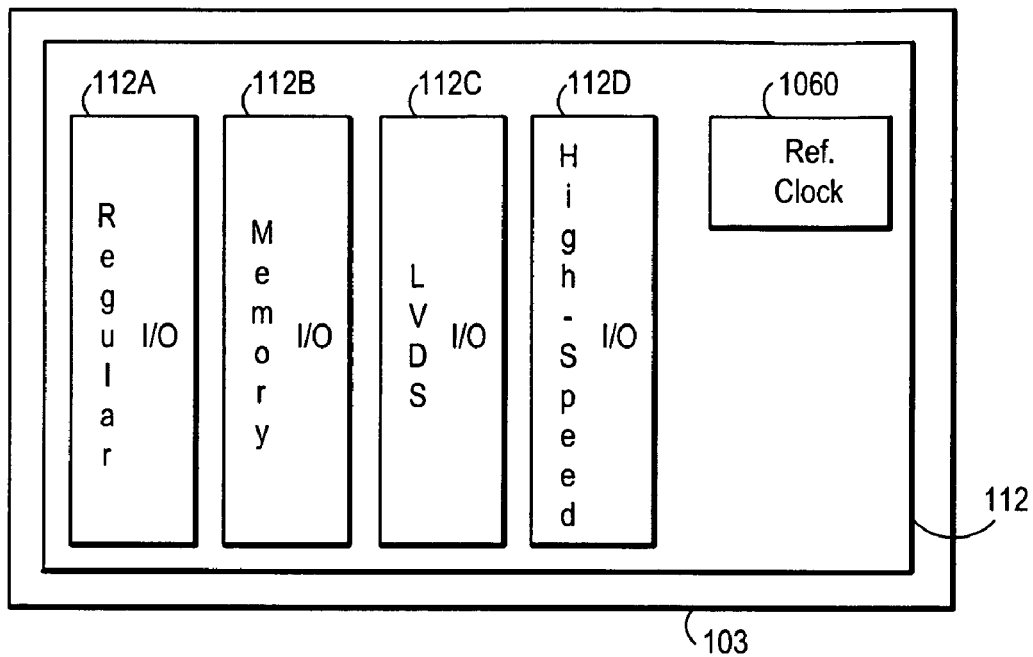
FIG. 19 depicts a simplified block diagram of partitioned I/O circuitry whose performance is adjusted according to exemplary embodiments of the invention.

FIG. 19 shows a simplified block diagram of an I/O circuit 112 partitioned according to the inventive concepts. The partitioned I/O circuitry in FIG. 19 includes regular I/O circuitry 112A, memory I/O circuitry 112B, LVDS I/O circuitry 112C, and high-speed I/O circuitry 112D. As persons of ordinary skill in the art who have the benefit of the description of the invention understand, the partitioning described here typically constitutes a logical or conceptual partitioning, and not necessarily physical partitioning. In other words, for I/O circuitry that constitutes an IP block, one may partition the circuitry and adjust its performance, as described above.

For other I/O circuitry, however, the circuitry might not constitute a "block" as shown in FIG. 19 (e.g., one may distribute the circuitry within in a non-contiguous manner). Regardless, one may apply the performance adjustment techniques described here with a desired level of granularity.

Note that the circuit arrangement in FIG. 19 also includes reference clock circuit 1060. Reference clock circuit 1060 may include one or more clock signals to one or more of the I/O circuits in FIG. 19. One may apply the performance adjustment techniques described above to reference clock circuit 1060 (or some parts of it), with a desired level of granularity in order to generate reference clocks commensurate with the desired performance and power consumption of other blocks in FIG. 19 and/or other parts of PLD 103.

Figure 20:
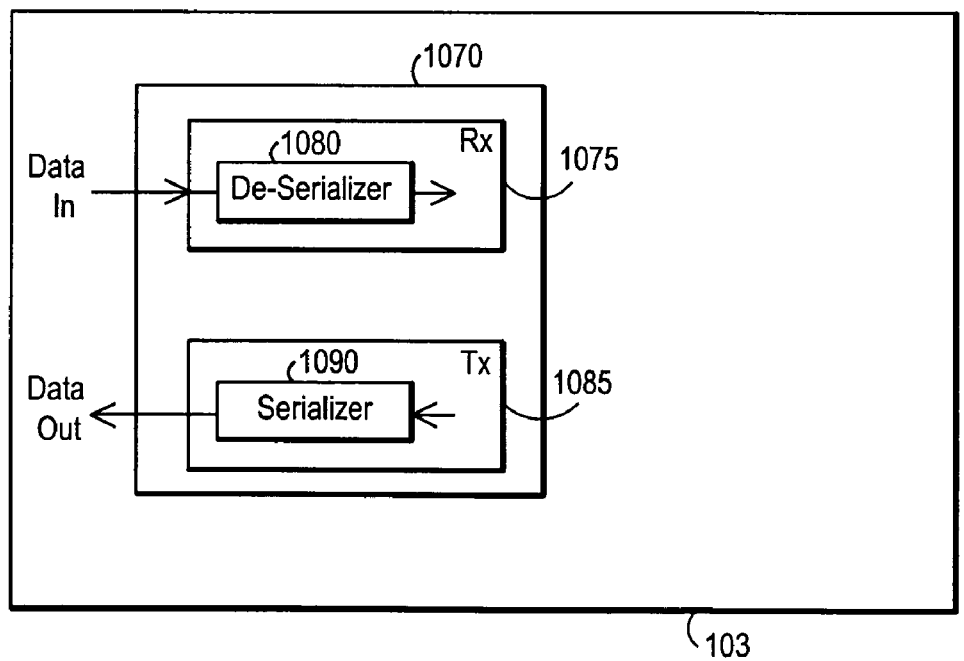
FIGS. 20-21 show simplified block diagrams of various types of I/O circuitry whose performance is adjusted according to exemplary embodiments of the invention.
Figure 21:
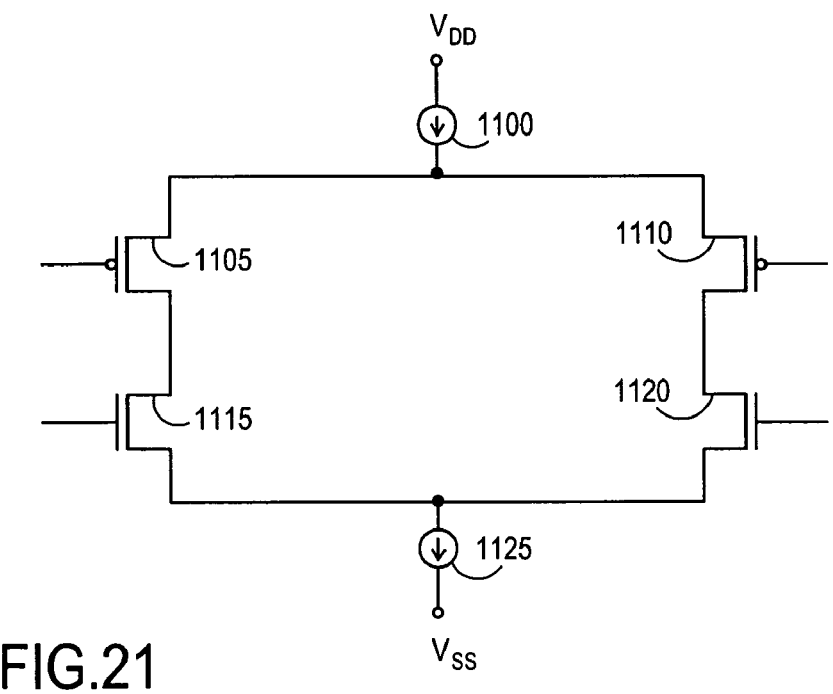

FIGS. 20-21 show simplified block diagrams of various types of I/O circuitry whose performance is adjusted according to exemplary embodiments of the invention. More specifically, FIG. 20 shows a simplified block diagram of a transceiver circuit 1070. Transceiver circuit 1070 includes receiver 1075 and transmitter 1085. Receiver circuit includes de-serializer circuit 1080. De-serializer circuit 1080 receives serial data in (e.g., from another circuit in PLD 103 or from a source external to PLD 103), and converts the serial data to another form, such as parallel data.

Serializer circuit 1090 accepts data in a non-serial form (e.g., parallel data), and converts the data to serial form. Serializer circuit 1090 provides the data (labeled "DATA OUT") to either circuitry within PLD 103 or to a destination external to PLD 103.

One may apply the performance adjustment techniques described above to transceiver 1070, i.e., to receiver 1075 and/or transmitter 1085, as desired. Thus, one may apply the techniques to de-serializer circuit 1080 and/or serializer circuit 1090, with a prescribed level of granularity, as desired.

FIG. 21 shows a simplified circuit arrangement for an LVDS I/O circuitry. The circuit arrangement of FIG. 21 includes current source 1100, current source 1125, PMOS transistors 1105 and 1110, and NMOS transistors 1115 and 1120. The circuit arrangement in FIG. 21 operates generally in the manner that persons of ordinary skill in the art who have the benefit of the description of the invention understand.

One may apply the performance adjustment techniques described above to the LVDS circuit in FIG. 21. Thus, one may provide power to the circuit depending on whether it is used (e.g., whether a user's circuit uses the circuit arrangement), adjust the level of the supply voltage provided to the circuit, and/or adjust the body bias level(s) provided to the circuit, as desired. As described above, one may apply each of the techniques with any level of granularity desired (although, given the relative simplicity of the circuit, one would likely, but not necessarily, either apply power to all of it or to none of it).

For example, one may adjust the level of the supply voltage, $V_{DD}$, or the ground voltage (or other supply voltage), $V_{SS}$, as desired. Furthermore, one may adjust the body bias levels of one or more of PMOS transistors 1105 and 1110, and/or NMOS transistors 1115 and 1120. Note that, in addition or instead, one may adjust the body bias level(s) of one or more of transistors 1105, 1110, 1115, and 1120, one or more transistors in current source 1100, and/or one or more transistors in current source 1125, as desired.

In addition to I/O circuitry, one may apply the inventive concepts to other circuits, such as clock data recovery (CDR) circuits or PLL circuits, as desired. In either case, one may apply one or more of the performance adjustment techniques to one or more circuits or blocks of circuitry, as desired.

Figure 22:
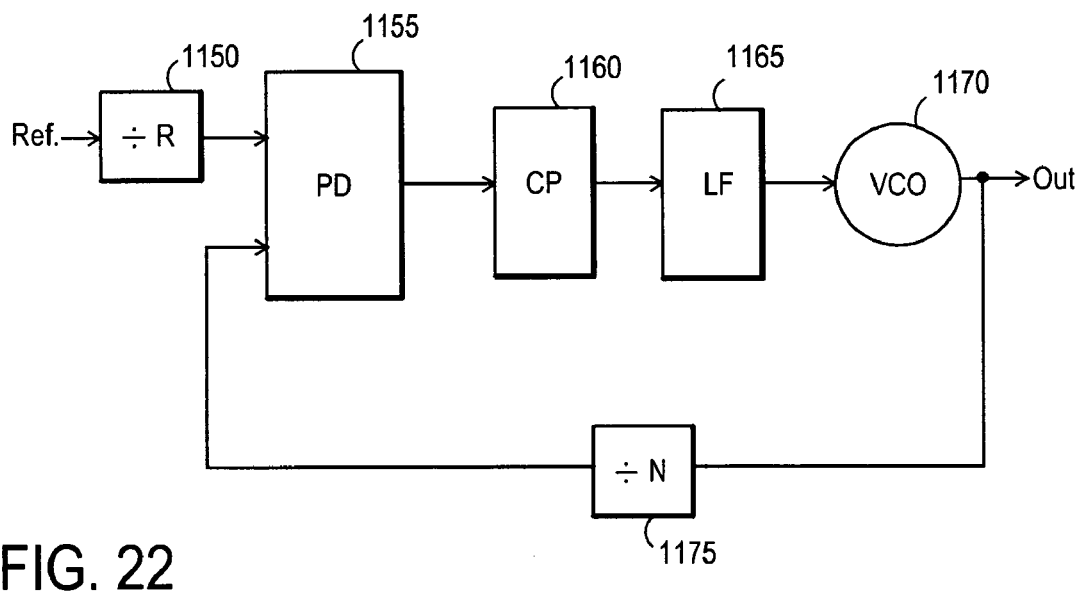
FIG. 22 illustrates a simplified block diagram of a phase locked loop (PLL) whose performance is adjusted according to exemplary embodiments of the invention.

FIG. 22 shows a simplified block diagram of a PLL whose performance is adjusted according to exemplary embodiments of the invention. The PLL includes divider 1150, phase detector 1155, charge pump 1160, loop filter 1165, VCO 1170, and divider 1175. The PLL operates generally in the manner that persons of ordinary skill in the art who have the benefit of the description of the invention understand.

As noted above, one may adjust the performance of the PLL using one or more of the inventive concepts. For example, if the user's circuit does not use a PLL, one may disable the PLL by not providing power to it. If the user's circuit does use the PLL, however, one may adjust the supply levels provided to one or more of the various blocks and circuits of the PLL. In addition, one may adjust the body bias level(s) for one or more of the circuits or blocks within the PLL, with a desired or appropriate level of granularity.

For example, one may adjust the supply voltage(s) applied to VCO 1170 in order to trade off phase noise and power consumption. In addition or instead, one may adjust the body bias level(s) of some of transistors in VCO 1170 to accomplish the same goal, or to control and tune leakage, or adjust other performance measures, as desired.

Figure 23:
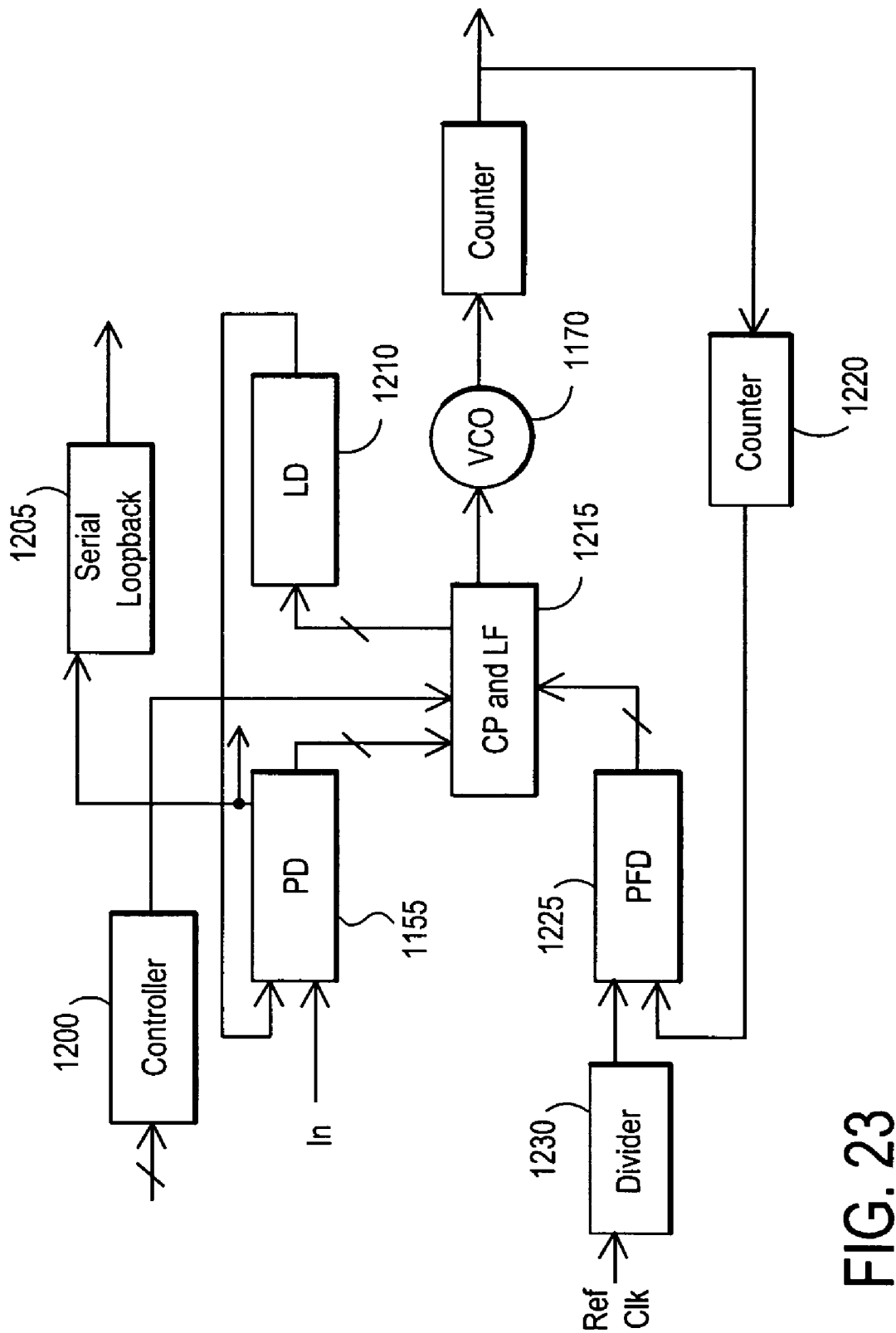
FIG. 23 depicts a simplified block diagram of a clock data recovery (CDR) circuit whose performance is adjusted according to exemplary embodiments of the invention.

FIG. 23 depicts a simplified block diagram of a clock data recovery (CDR) circuit whose performance is adjusted according to exemplary embodiments of the invention. The CDR circuit includes controller 1200, serial loopback circuit 1205, phase detector 1210, VCO 1170, charge pump/loop filter 1215, counter 1218, converter 1220, phase frequency detector 1225, divider 1230, and phase detector 1155. The CDR circuit operates generally in the manner that persons of ordinary skill in the art who have the benefit of the description of the invention understand.

One may adjust the performance of the CDR circuit using one or more of the inventive concepts. For example, if the user's circuit does not use a CDR circuit, one may disable the CDR circuit by not providing power to it. Conversely, if the user's circuit utilizes a CDR circuit, one may adjust the supply levels provided to one or more of the various blocks and circuits of the CDR circuit. In addition, as noted above, one may adjust the body bias level(s) for one or more of the circuits or blocks within the CDR circuit. One may do so with a desired or appropriate level of granularity.

Similar to the example described for the PLL circuit above, one may adjust the supply voltage(s) applied to VCO 1170 in order to trade off phase noise and power consumption. In addition or instead, one may adjust the body bias level(s) of some of transistors in VCO 1170 to achieve the same result, or to control and tune leakage, or adjust other performance measures, as desired.

As noted above, one may adjust the performance of virtually any block or portion or circuit in the IP block(s), as desired. Referring to the PLL and CDR circuits above, for instance, one may adjust the performance of the circuit (and the PLD, overall) by applying the disclosed techniques to the charge pump and/or loop filter.

Figure 24:
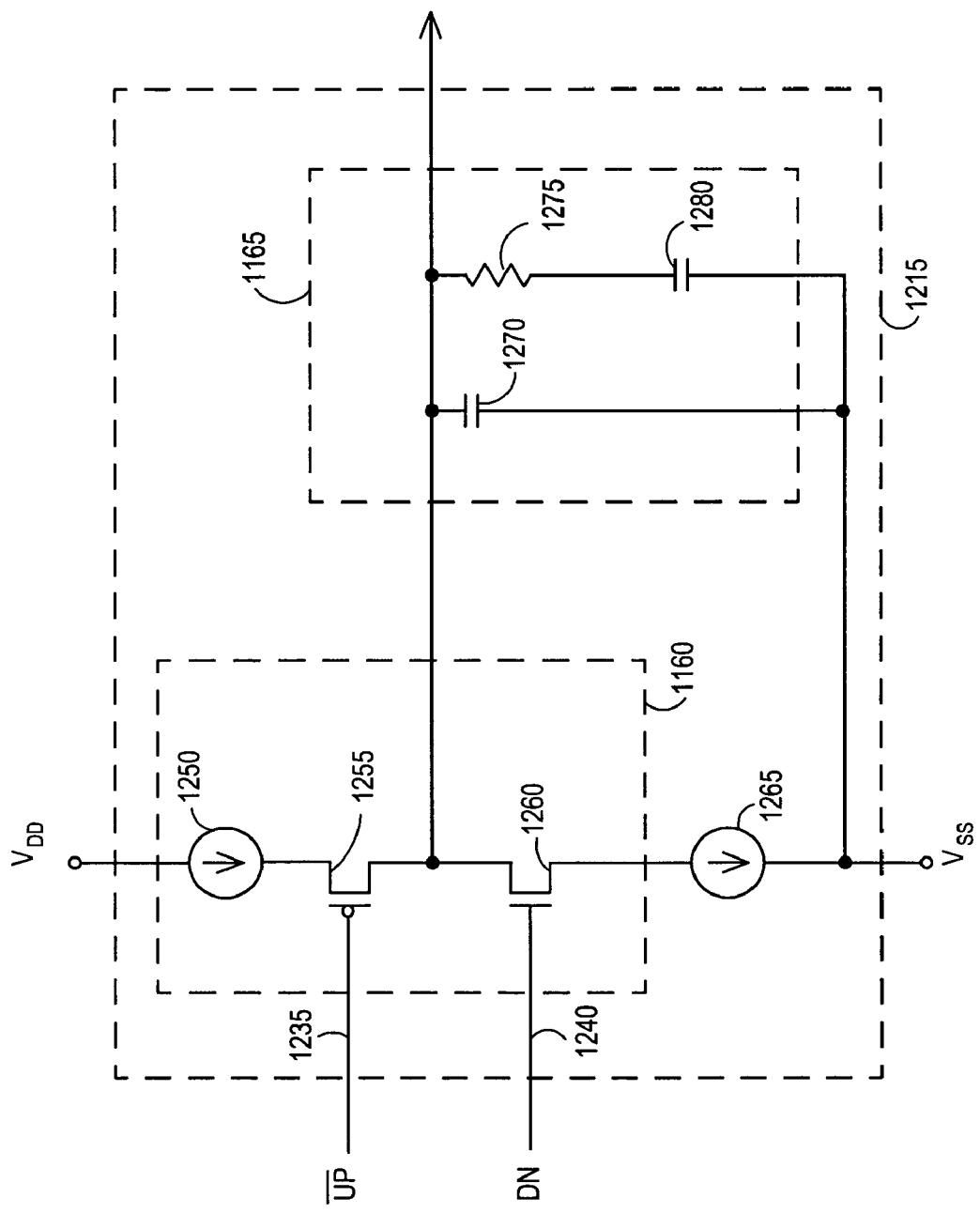
FIG. 24 shows a simplified block diagram of a charge pump and loop filter whose performance is adjusted according to exemplary embodiments of the invention.

FIG. 24 shows a simplified block diagram of a charge pump 1160 and loop filter 1165 whose performance and, hence, the performance of the overall circuit in which they reside, is adjusted according to exemplary embodiments of the invention. Charge pump 1160 includes current source 1250, PMOS transistor 1255, NMOS transistor 1260, and current source 1265. Loop filter 1165 includes capacitor 1270 coupled in parallel fashion to the cascade of resistor 1275 and capacitor 1280. Charge pump 1160 and loop filter 1165 operate generally in the manner that persons of ordinary skill in the art who have the benefit of the description of the invention understand.

One may adjust the performance of the charge pump 1160 and loop filter 1165 using one or more of the inventive concepts. For example, if the user's circuit does not use charge pump 1160 and loop filter 1165, one may disable either circuit or both circuits by not providing power to it/them. Conversely, if the user's circuit utilizes charge pump 1160 and loop filter 1165, one may adjust the supply levels provided to charge pump 1160 and loop filter 1165. In addition, as noted above, one may adjust the body bias level(s) for one or more of the circuits or blocks within charge pump 1160 and loop filter 1165 at a desired or appropriate level of granularity.

As examples, one may adjust the level of the supply voltage, $V_{DD}$, or the ground voltage (or other supply voltage), $V_{SS}$, as desired. Furthermore, one may adjust the body bias levels of PMOS transistor 1255, and/or PMOS transistor 1260. Note that, in addition or instead, one may adjust the body bias level(s) of PMOS transistor 1255, PMOS transistor 1260, one or more transistors in current source 1250 and/or current source 1265, as desired.

Figure 25:
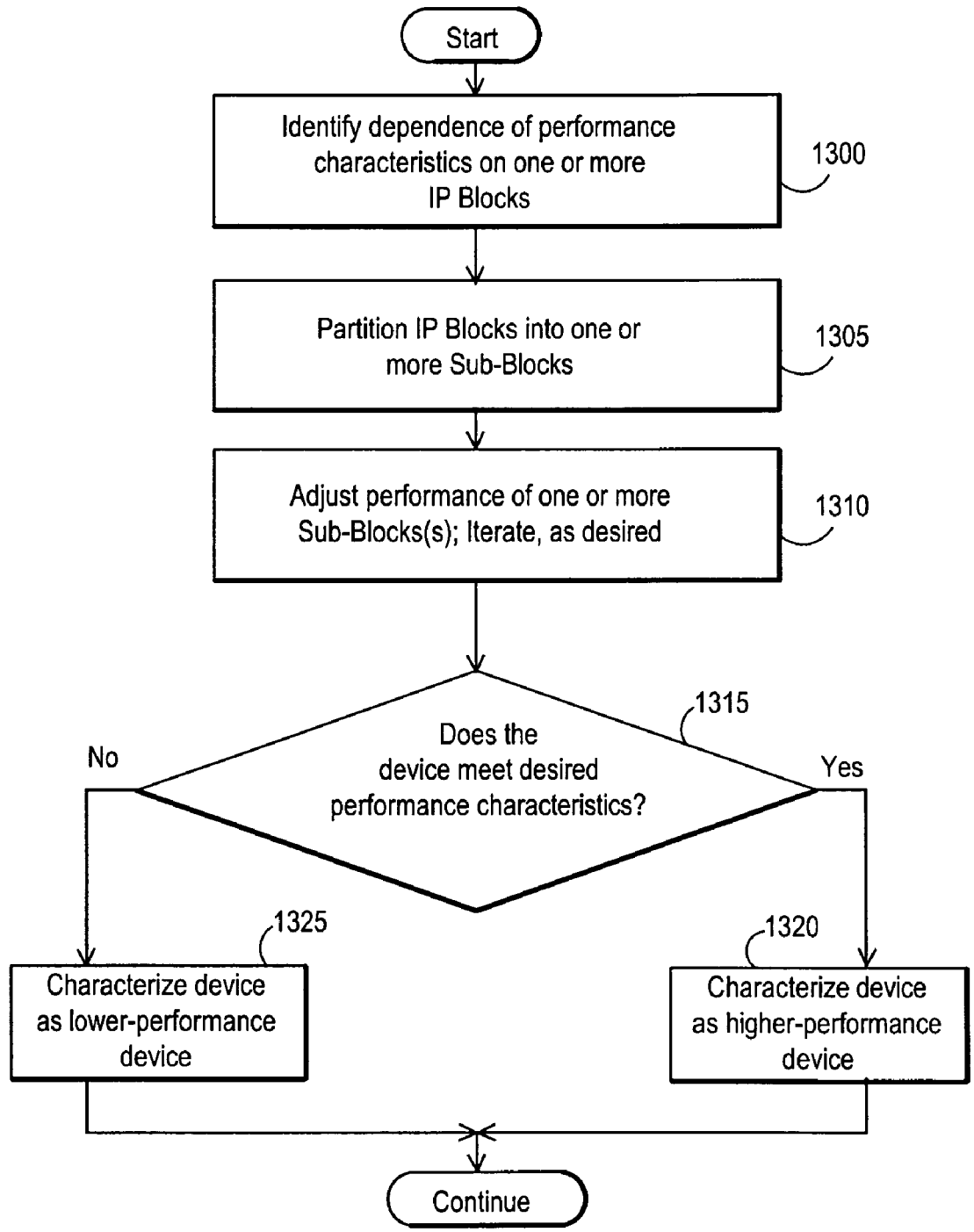
FIG. 25 illustrates a simplified flow diagram of a technique according to the invention for adjusting performance of circuitry in a PLD according to exemplary embodiments of the invention.

In addition to applying performance adjustment techniques during or as part of the PLD CAD flow, one may apply such techniques after manufacture of the PLD, before it becomes available to the user. FIG. 25 illustrates a simplified flow diagram of a technique according to the invention for adjusting performance of circuitry in a PLD according to exemplary embodiments of the invention.

The technique pertains to adjusting the performance of PLDs and characterizing the PLDs according to their performance level. The characterization of the PLDs avoids discarding devices that might not meet relatively stringent specifications, and instead use them for less stringent applications. After characterization, one may label and sell the PLDs according to the results of the characterization, i.e., according to the performance capabilities of the PLDs.

Note that, by using redundant circuitry that might be available within the PLD, one might be able to "repair" the PLD such that it meets the desired performance specifications. Because of their nature (i.e., implemented within the PLD as a block of circuit), typical PLDs do not include any or many duplicate or redundant copies of IP blocks. As a result, the performance adjustment techniques provide a way of increasing the yield of PLDs.

Referring to FIG. 25, at 1300, one identifies the dependence of the PLD's performance characteristics on one or more IP blocks. For example, one might determine that to have a particular part designation, a VCO within the PLD has to meet a prescribed level of phase noise.

At 1305, one partitions the IP block(s) into one or more sub-blocks. Subsequently, at 1310, one adjusts the performance of the sub-block(s). Note that one may iterate this process a number of times, as desired. At 1315, one determines whether the PLD meets the desired performance characteristic(s). If so, one characterizes the device as being capable of achieving the desired performance characteristic(s), e.g., as a higher-performance or high-performance device. If not, one characterizes the device as a lower-performance or low-performance device.

Note that one may apply the inventive concepts effectively to various programmable logic circuitry or ICs known by other names in the art, as desired, and as persons skilled in the art with the benefit of the description of the invention understand. Such circuitry include devices known as complex programmable logic device (CPLD), programmable gate array (PGA), and field programmable gate array (FPGA).

Referring to the figures, persons of ordinary skill in the art will note that the various blocks shown may depict mainly the conceptual functions and signal flow. The actual circuit implementation may or may not contain separately identifiable hardware for the various functional blocks and may or may not use the particular circuitry shown. For example, one may combine the functionality of various blocks into one circuit block, as desired. Furthermore, one may realize the functionality of a single block in several circuit blocks, as desired. The choice of circuit implementation depends on various factors, such as particular design and performance specifications for a given implementation, as persons of ordinary skill in the art who have the benefit of the description of the invention understand. Other modifications and alternative embodiments of the invention in addition to those described here will be apparent to persons of ordinary skill in the art who have the benefit of the description of the invention. Accordingly, this description teaches those skilled in the art the manner of carrying out the invention and are to be construed as illustrative only.

The forms of the invention shown and described should be taken as the presently preferred or illustrative embodiments. Persons skilled in the art may make various changes in the shape, size and arrangement of parts without departing from the scope of the invention described in this document. For example, persons skilled in the art may substitute equivalent elements for the elements illustrated and described here. Moreover, persons skilled in the art who have the benefit of this description of the invention may use certain features of the invention independently of the use of other features, without departing from the scope of the invention.

The invention claimed is:

1. A programmable logic device (PLD), comprising:
   at least one intellectual property (IP) block of the programmable logic device (PLD) whose performance is adjusted to meet at least one first performance characteristic, wherein the performance of the at least one intellectual property (IP) block is adjusted by changing a supply level of the at least one intellectual property (IP) block and by adjusting at least one body bias level of the intellectual property (IP) block; and
   at least one input/output (I/O) block of the programmable logic device (PLD) whose performance is adjusted to meet at least one second performance characteristic, wherein the performance of the at least one input/output (I/O) block is adjusted by changing a supply level of the at least one input/output (I/O) block and by adjusting at least one body bias level of the input/output (I/O) block.

2. The programmable logic device (PLD) according to claim 1, wherein the at least one intellectual property (IP) block comprises a digital signal processor (DSP).

3. The programmable logic device (PLD) according to claim 1, wherein the at least one intellectual property (IP) block comprises communication circuitry.

4. The programmable logic device (PLD) according to claim 1, wherein the at least one intellectual property (IP) block comprises memory circuitry.

5. The programmable logic device (PLD) according to claim 1, wherein the at least one intellectual property (IP) block comprises a processor.

6. The programmable logic device (PLD) according to claim 1, wherein the at least one intellectual property (IP) block comprises a phase locked loop (PLL) circuit.

7. The programmable logic device (PLD) according to claim 1, wherein the at least one intellectual property (IP) block comprises a clock data recovery (CDR) circuit.

8. The programmable logic device (PLD) according to claim 1, wherein the at least one input/output (I/O) block comprises low voltage differential signal (LVDS) circuitry.

9. The programmable logic device (PLD) according to claim 1, wherein the at least one input/output (I/O) block comprises memory input/output (I/O) circuitry.

10. The programmable logic device (PLD) according to claim 1, wherein the at least one input/output (I/O) block comprises programmable logic device (PLD) input/output (I/O) circuitry.

11. The programmable logic device (PLD) according to claim 1, wherein the at least one input/output (I/O) block comprises high-speed input/output (I/O) circuitry.

12. The programmable logic device (PLD) according to claim 1, wherein the at least one input/output (I/O) block comprises a transceiver.

13. The programmable logic device (PLD) according to claim 10, wherein the transceiver comprises a serializer circuit.

14. The programmable logic device (PLD) according to claim 1, wherein the at least one input/output (I/O) block comprises a de-serializer circuit.

15. A method of adjusting performance of a programmable logic device (PLD) that includes a plurality of intellectual property (IP) blocks, the method comprising:
   identifying dependence of a performance characteristic of the programmable logic device (PLD) on a performance characteristic of one or more intellectual property (IP) blocks;
   partitioning each intellectual property (IP) block into a plurality of sub-blocks; and
   adjusting a performance characteristic of at least one sub-block in the plurality of sub-blocks by deciding to provide power to the sub-block, by selecting at least one power supply level provided to the sub-block, and by selecting at least one body bias level supplied to the sub-block.

16. The method according to claim 15, wherein the at least one sub-block comprises a voltage controlled oscillator (VCO) within a clock data recovery (CDR) circuit.

17. The method according to claim 16, wherein the at least one sub-block comprises a charge pump within the voltage controlled oscillator (VCO).

18. The method according to claim 15, wherein the at least one sub-block comprises a voltage controlled oscillator (VCO) within a phase locked loop (PLL) circuit.

19. The method according to claim 18, wherein the at least one sub-block comprises a charge pump within the voltage controlled oscillator (VCO).

20. The method according to claim 15, wherein the at least one sub-block comprises a current source within an low voltage differential signal (LVDS) circuit.

21. The method according to claim 15, wherein the at least one sub-block comprises a serializer within a transceiver.

22. The method according to claim 15, wherein the at least one sub-block comprises a de-serializer within a transceiver.

* * * * *